United States Patent
Rembarz et al.

(10) Patent No.: US 8,837,484 B2
(45) Date of Patent: Sep. 16, 2014

(54) METHODS AND DEVICES FOR A CLIENT NODE TO ACCESS AN INFORMATION OBJECT LOCATED AT A NODE OF A SECURED NETWORK VIA A NETWORK OF INFORMATION

(75) Inventors: Rene Rembarz, Aachen (DE); Joachim Sachs, Aachen (DE); Daniel Catrein, Herzogenrath (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 606 days.

(21) Appl. No.: 13/124,967

(22) PCT Filed: Sep. 8, 2009

(86) PCT No.: PCT/EP2009/061654
§ 371 (c)(1),
(2), (4) Date: Jun. 14, 2011

(87) PCT Pub. No.: WO2010/046178
PCT Pub. Date: Apr. 29, 2010

(65) Prior Publication Data
US 2011/0286459 A1 Nov. 24, 2011

Related U.S. Application Data

(60) Provisional application No. 61/106,776, filed on Oct. 20, 2008.

(51) Int. Cl.
H04L 12/28 (2006.01)
H04L 12/56 (2006.01)
H04L 12/751 (2013.01)
H04L 29/06 (2006.01)
H04L 29/12 (2006.01)
H04W 12/06 (2009.01)
H04L 12/701 (2013.01)

(52) U.S. Cl.
CPC .............. *H04W 12/06* (2013.01); *H04L 45/10* (2013.01); *H04L 63/0892* (2013.01); *H04L 61/106* (2013.01); *H04L 63/0869* (2013.01); *H04L 29/0653* (2013.01); *H04L 61/1582* (2013.01); *H04L 63/10* (2013.01); *H04L 45/00* (2013.01)

USPC .......................................................... 370/392

(58) Field of Classification Search
None
See application file for complete search history.

(56) References Cited

U.S. PATENT DOCUMENTS 7,096,266 B2   8/2006 Lewin et al.

FOREIGN PATENT DOCUMENTS

WO        02/069608 A2    9/2002

OTHER PUBLICATIONS

Ahlgren, B. et al. "A Node Identity Internetworking Architecture." Proceedings of the 25th IEEE International Conference on Computer Communications, Barcelona, Spain, Apr. 23-29, 2006.

(Continued)

*Primary Examiner* — Ayaz Sheikh
*Assistant Examiner* — Blanche Wong
(74) *Attorney, Agent, or Firm* — Coats & Bennett, PLLC

(57) ABSTRACT

A method for a client node (D100) to access an information object (102) located at a node (D500) of a secured network (120) via a network of information (100) wherein information objects (102) are identified by information object identities (IDObj, ID'Obj) and wherein nodes are identified by locators (LGW, LObj), wherein the following is performed at a routing node (D102): —receiving from the client node (D100) an information object identity related to the information object (102), —sending the information object identity to a resolving node (D400) of the network of information (100), the resolving node (D400) being capable of initiating a procedure for sending to the routing node (D102) a locator of a gateway node (D200) interfacing the network of information (100) and the secured network (120), —receiving the locator of the gateway node (D200), —sending a request for the information object (102) to the gateway node (D200) according to the locator, —receiving the requested information object (102) from the gateway node (D200), and —sending the information object (102) to the client node (D100).

32 Claims, 17 Drawing Sheets

(56) References Cited

OTHER PUBLICATIONS

Kafle, V. P. et al. "Generic Identifiers for ID/Locator Split Internetworking." First ITU-T Kaleidoscope Academic Conference on Innovations in NGN: Future Network and Services, Geneva, Switzerland, May 12-13, 2008.

Dannewitz, C. et al. "Scenarios and Research Issues for a Network of Information." 4th International ICST Mobile Multimedia Communications Conference, Jul. 7, 2008.

Jacobson, V. et al. "Content-Centric Networking." Whitepaper Describing Future Assurable Global Network, Jan. 30, 2007.

Author Unknown. "Seventh Framework Programme, Objective ICT-2007.1.1, The Network of the Future." Grant agreement for: Large-scale integration project, Annex I—"Description of Work", Nov. 2007.

3rd Generation Partnership Project. 3GPP TA 33.102, V8.0.0 (Jun. 2008). 3rd Generation Partnership Project; Technical Specification Group Services and System Aspects; 3G Security; Security architecture (Release 8). Jun. 2008.

3rd Generation Partnership Project. 3GPP TS 33.220, V8.3.0 (Mar. 2008). 3rd Generation Partnership Project; Technical Specification Group Services and System Aspects; Generic Authentication Architecture (GAA); Generic bootstrapping architecture (Release 8). Mar. 2008.

Niemi, A. et al. "Hypertext Transfer Protocol (HTTP) Digest Authentication Using Authentication and Key Agreement (AKA)." IETF Network Working Group, Request for Comments: 3310, Category: Informational, Sep. 2002.

Neuman, C. et al. "The Kerberos Network Authentication Service (V5)." IETF Network Working Group, Request for Comments: 4120, Obsoletes: 1510, Category: Standards Track, Jul. 2005.

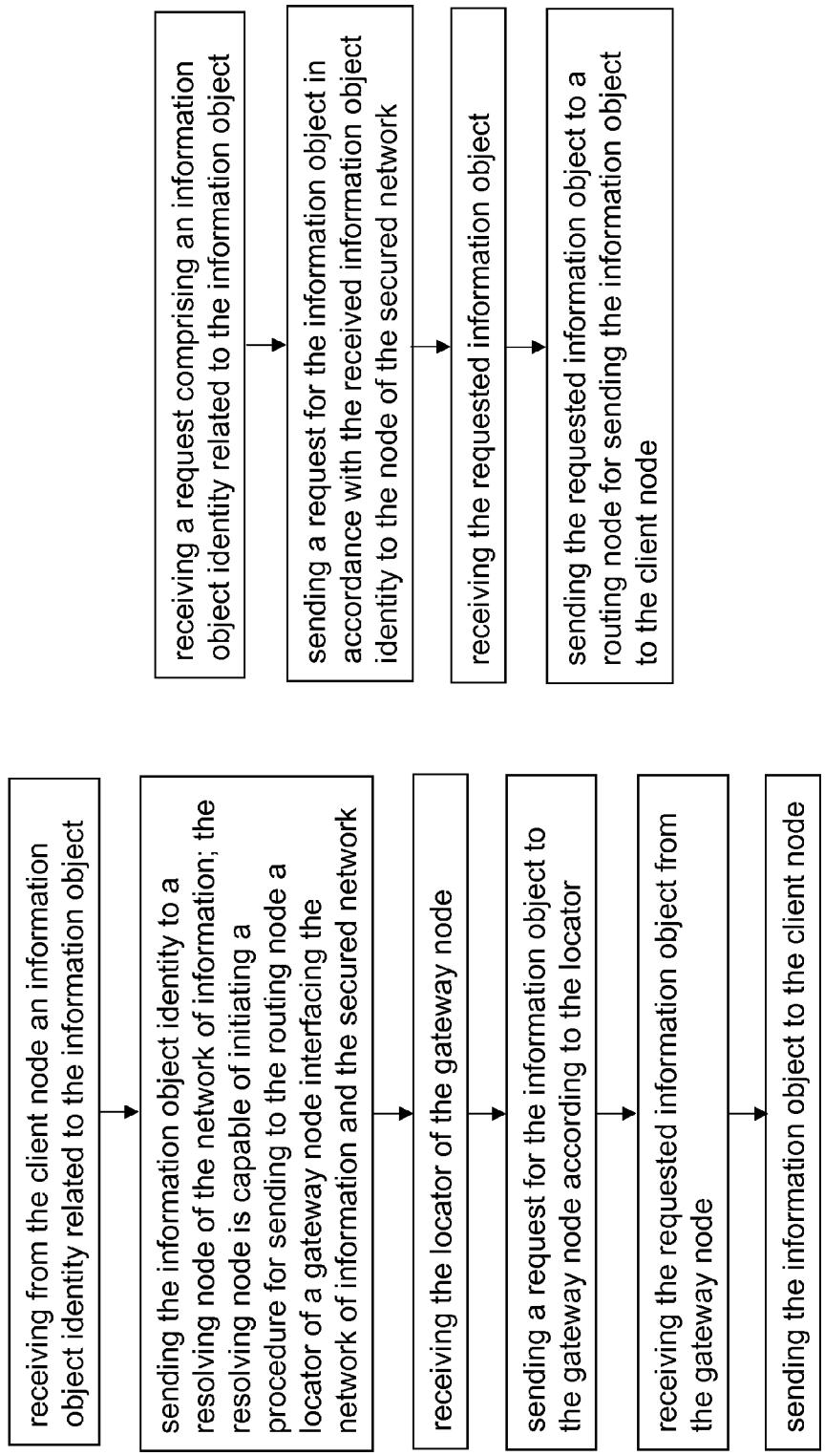

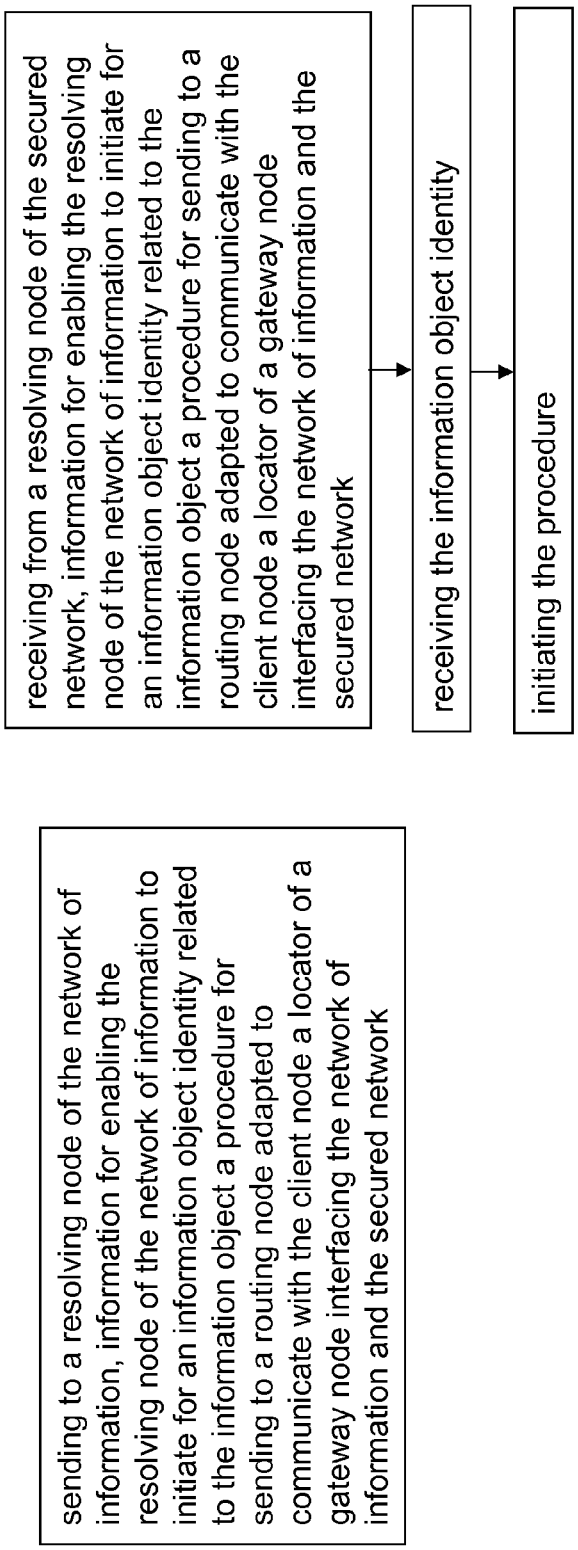

METHODS AND DEVICES FOR A CLIENT NODE TO ACCESS AN INFORMATION OBJECT LOCATED AT A NODE OF A SECURED NETWORK VIA A NETWORK OF INFORMATION

This application claims the benefit of the filing date of U.S. Provisional Patent Application No. 61/106,776 filed Oct. 20, 2008, the disclosure of which is hereby incorporated herein by reference.

TECHNICAL FIELD

The invention relates to communication, especially to methods for a client node to access an information object located at a node of a secured network via a network of information, nodes adapted to perform such methods, computer programs adapted to perform such methods, and a computer-readable medium product comprising such computer programs.

BACKGROUND

Over 90% of the traffic in today's internet is so-called dissemination traffic, i.e. operations such as retrieving a website or downloading a video. In contrast to point-to-point connections (such as a voice over IP conversation), where the source and the destination address are essential parts of the communication, dissemination traffic has different characteristics. In many cases it is completely irrelevant who delivers the desired content, as long as it can be assured that the correct content is delivered (this can be verified for instance by cryptography such as a digital signature). Classical examples are a webpage or a video file.

Driven by this trend, the networking research community has lately started investigating so-called content-centric networks (compare V. Jacobson, M. Mosko, D. Smetters, and J. Garcia-Luna-Aceves, "Content-centric networking", Whitepaper, Palo Alto Research Center, January 2007), also referred to as information-centric networks. A characteristic of such networks is that information objects become the first order elements in the network, i.e. already the routing layer is aware of the content that is transported. This opens the door to many optimizations not possible conventionally, such as optimized routing or transparent caching.

In the 4WARD project (compare http://www.4ward-project.eu), this scope has even been broadened, so that also the virtual representations of real-world objects (such as the Eiffel tower) and non-dissemination traffic (such as a voice call) shall be handled. The corresponding concept is referred to as Networks of Information, NetInf (compare C. Dannewitz, K. Pentikousis, R. Rembarz, E. Renault, O. Strandberg, and J. Ubillos, "Scenarios and research issues for a Network of Information", In Proc. 4th Int. Mobile Multimedia Communications Conf., Oulu, Finland, July 2008).

A fundamental aspect of NetInf that influences the overall architecture is the identifier/locator split. In NetInf, the functional overloading of IP addresses acting as both identifiers and locators may be eliminated via a clean split of those two functions. Each information object (denoted e.g. by "Obj") may have a locator (denoted e.g. by "$L_{Obj}$") pointing at the location of the information object in the network and a separate identifier (denoted e.g. by "$ID_{Obj}$"), enabling the persistent identification of the information object regardless of possible location changes or replication in the network of information. In order to make this system work, the bindings and indirections between the different objects need to be handled efficiently; this task is carried out by a Name Resolving (NR, Name Resolver/Name Resolution) entity.

In the context of this application, the term "network of information" (NetInf) may hence particularly denote a communication network in which a plurality of communicatively coupled nodes are provided and which is based on an information-centric architecture in which a provisioning of information objects is possible based on an identity, ID, identifying a specific information object unambiguously (for example uniquely) in the network of information and based on a locator, L, specifying a location of the network of information at which the specific information object is available. An identifier of an information object can be used for identifying an information object during communication of different nodes of a network of information and can be used for distinguishing between an information object and other information objects. A locator, sometimes also known as "location pointing information" points at a location (such as a node capable of providing specific data) of an information object in a network of information. An example for a locator is a data block serving as an address of a node at which the corresponding information object is available. Such an address may be for instance an Internet Protocol (IP) address being a numerical identification (logical address) that can be assigned to devices participating in a computer network utilizing the Internet Protocol for communication between its nodes. A locator may provide a link to a node at which a specific information object is available for download. In other words, a locator may be considered as an address at which a corresponding information object can be accessed at.

A network of information may involve wired and/or wireless communication between the various nodes. A network of information is also called content-centric network or information-centric network. A locator points at a location of a data object in a network, for instance it denotes a network address, for example an IP address.

The term "node" may particularly denote a communication entity which may be configured for communication with one or more other communication entities in a network. For instance, such a node may be a user equipment to be operated by a user and to be coupled to a communication network. Examples are mobile phones, laptops or personal computers, data cards for plugging or on-board integration into laptops or personal computers, personal digital assistants (PDAs), navigation systems, etc. Hence, mobile (for example portable) or stationary communication devices can be operated in accordance with an corresponding communication architecture. For instance, such a communication device may be used in the context of telecommunications.

The term "information object" may particularly denote a set of data representing information content or use data (for instance text such as a database or a story or an article, or multimedia content such as music data, video data, or any other information related to a service or an application) which can be requested by one node and provided by another node communicatively coupled to one another in a network of information. Such an information object may be characterized for communication purposes by an information object identity in combination with corresponding location pointing information.

The term "resolving node" (sometimes also known as "resolution node") may particularly denote a name resolver node in a network of information. A publishing initiation node may provide the resolving node with one or more locators regarding a corresponding information object. The latter can be provided by the publishing initiation node upon request of a client node (which may also be denoted as an information object requesting node). Hence, a resolving node may manage or handle data blocks each of which including an indication at which location or node of a network of information an information object or other piece of data is available. Such a resolving node may be configured for receiving such data blocks from a publishing initiation node offering a corresponding service and may be configured for transmitting such data blocks to a client node requesting a corresponding service.

The term "publishing initiation node" may particularly denote a node in a network of information which node can indicate to the resolving node an information object in conjunction with an assigned locator and may therefore indicate which information object is available where in a network. The publishing initiation node may be at the same time the provider of a corresponding information object itself or may be another communication entity.

The term "client node" (or "information object requesting node") may particularly denote a node in a network of information which node may search for a location of a specific information object in a network of information. For this purpose, the client node may initiate sending of a query to a resolving node and may ask the latter for a location of a node offering a corresponding service of providing the desired information object.

The term "gateway node" may particularly denote a network node equipped for interfacing between two networks, for instance that differ regarding security requirements and/or regarding different protocols.

The term "routing node" may particularly denote a node that forwards data packets between networks or between different nodes of a network.

Now referring to FIG. 2, in order make an information object 220 known in the network, it has to be published by a publishing initiation node 210. As illustrated in FIG. 2, this is done by sending a PUBLISH message to a resolving node (or Name Resolver (NR)) 200 stating that the information object Obj 220 designated by the identifier $ID_{Obj}$ is available at the network location 210 designated by $L_{Obj}$. $L_{Obj}$ can also be a list of locations. If the information object Obj 220 has already been published before, the additional location is added to the database or an existing entry is updated in the database, if this is the first registration, a new entry is created.

FIG. 3 illustrates the process of retrieving an information object Obj 220 from the NetInf network. As outlined above, a network of information allows a user to request access to an information object Obj 220 based on an identifier $ID_{Obj}$ regardless from which location the information object 220 will be provided. The identifier $ID_{Obj}$ may be obtained, for instance via a link in an email or via a search operation.

Consequently, firstly a client node 230 (functioning as an information object requesting node) resolves the identifier $ID_{Obj}$ of the object 220 into its locator $L_{Obj}$. A RESOLVE message (step 1) comprising the identifier $ID_{Obj}$ is sent to resolving node 200 which can look-up a locator $L_{Obj}$ corresponding to the identifier $ID_{Obj}$. The locator $L_{Obj}$ pointing to a location 210 where the information object Obj 220 can be obtained from is subsequently sent from the resolving node 200 to the client node 230 in step 2 in FIG. 3. In FIG. 3, the client node 230 comprises a name resolving client (NRC) 250 located on the client node 230 itself for the resolving. After the locator $L_{Obj}$ is known to the client node 230, the client node 230 can proceed and retrieve the information object Obj 220 from the actual storage location identified by the locator $L_{Obj}$. Client node 230 can send a request message GET for requesting the information object Obj 220 with identifier $ID_{Obj}$ to a node 210 identified by locator $L_{Obj}$. The node 210 can then obtain, e.g. from an own storage, the information object Obj 220 corresponding to the identifier $ID_{Obj}$ and send the information object Obj 220 to the client node 230.

While the former case is more likely to be used when NetInf is deployed as an overlay to IP, native NetInf-enable networks also make it possible to handle the name resolving in the network, i.e. by the NetInf aware routing node(s) which contact the resolving node 200 and request a storage location denoted by a locator.

As illustrated in FIG. 4, this can for instance be realized by an NRC entity 250 present on a first hop router (FHR) 240. The request can then—as in the above example—be routed to the storage location.

Once a client node 230 has retrieved an information object, it can optionally be published again with the location of the client node 230, similar as in peer-to-peer networks. Optional encryption ensures that only authorized parties can access the actual data. Otherwise, the intention is to enable data to "roam around freely" in order to support replication, caching and other optimizations.

As can be taken from FIG. 5, today's Internet is strictly separated from private domains (secured network or private network, PN) such as a company network. Firewalls and gateway nodes ensure that attacks are not possible from the outside, and that private information does not leave the network.

In NetInf networks, these separations do not exist anymore. All information objects (including private information objects) are located in the Network of Information and can be addressed and accessed from any user via the NetInf control (more specifically: the location of every information object can be resolved using the common name resolving (NR) system and afterwards the information object can be retrieved from the resolved location). It is in many cases assumed that strong encryption of the information object is sufficient to protect private data by only being decodable by an authorized subset of the users, leading to a "virtual partitioning" of the network, as illustrated in FIG. 6.

Companies, government agencies and other stakeholders are unlikely to rely on virtual partitioning by encrypting objects as the only way of controlling and enforcing access to their data, as this will, for instance, put an enormous burden on the key management. In many cases, a strict partitioning of the network may be desired and necessary for trust reasons and to ensure that information with different confidentiality requirements and of different confidentiality levels is properly separated. This is necessary, for instance, for isolating confidential company-internal information from the rest of the Network of Information.

SUMMARY

It is therefore an object of the invention to overcome the aforementioned drawbacks and shortcomings and to improve the security in network-of-information-based communication systems.

In order to achieve the object defined above, methods for a client node to access an information object located at a node of a secured network via a network of information, nodes adapted to perform such methods, computer programs adapted to perform such methods, and a computer-readable medium product comprising such a computer program according to the independent claims are provided.

According to an exemplary embodiment of the invention, a method for a client node to access an information object located at a node of a secured (for instance private) network via a network of information is provided. Information objects are identified by information object identities and nodes are identified by locators. The method comprises, at a routing node, receiving from the client node an information object identity related to the information object, and sending the information object identity to a resolving node of the network of information. The resolving node is capable of initiating a procedure for sending to the routing node a locator of a gateway node interfacing the network of information and the secured network. The method further comprises, at the routing node, receiving the locator of the gateway node, sending a request for the information object to the gateway node according to the locator, receiving the requested information object from the gateway node, and sending the information object to the client node.

According to another exemplary embodiment of the invention, a method for a client node to access an information object located at a node of a secured (for instance private) network via a network of information is provided. Information objects are identified by information object identities and nodes are identified by locators. The method comprises, at a gateway node interfacing the network of information and the secured network, receiving a request comprising an information object identity related to the information object. The method further comprises, at the gateway node, sending a request for the information object in accordance with the received information object identity to the node of the secured network, receiving the requested information object, and sending the requested information object to a routing node for sending the information object to the client node.

According to yet another exemplary embodiment of the invention, a method for a client node to access an information object located at a node of a secured (for instance private) network via a network of information is provided. Information objects are identified by information object identities and nodes are identified by locators. The method comprises, at a resolving node of the secured network, sending to a resolving node of the network of information, information for enabling the resolving node of the network of information to initiate for an information object identity related to the information object a procedure for sending to a routing node adapted to communicate with the client node a locator of a gateway node interfacing the network of information and the secured network.

According to still another exemplary embodiment of the invention, a method for a client node to access an information object located at a node of a secured (for instance private) network via a network of information is provided. Information objects are identified by information object identities and nodes are identified by locators. The method comprises, at a resolving node of the network of information, receiving from a resolving node of the secured network, information for enabling the resolving node of the network of information to initiate for an information object identity related to the information object a procedure for sending to a routing node adapted to communicate with the client node a locator of a gateway node interfacing the network of information and the secured network. The method further comprises, at the resolving node of the network of information, receiving the information object identity, and initiating the procedure.

According to yet another exemplary embodiment of the invention, a corresponding node (such as a routing node, a gateway node, a resolving node of the network of information, a resolving node of the secured network) is provided which is adapted to perform a corresponding one of the methods having the above mentioned features.

According to still another exemplary embodiment of the invention, a system is provided for providing to a client node access to an information object located at a node of a secured (for instance private) network via a network of information. Information objects are identified by information object identities and nodes are identified by locators. The system comprises at least two, particularly all of the following nodes: a routing node configured for performing the corresponding above-mentioned method, a gateway node interfacing the network of information and the secured network and configured for performing the corresponding above-mentioned method, a resolving node of the secured network configured for performing the corresponding above-mentioned method, a resolving node of the network of information configured for performing the corresponding above-mentioned method, and the node of the secured network.

According to still another exemplary embodiment of the invention, a computer program is provided comprising code adapted to perform one of the above methods having the above mentioned features when loaded into a processing unit of a corresponding node.

According to yet another exemplary embodiment of the invention, a computer-readable medium product is provided which comprises at least one computer program having the above mentioned features.

Embodiments of the present invention also concern computer programs comprising portions of software codes in order to implement the methods as described above when operated at a respective device. A computer program can be stored on a computer readable medium. A computer-readable medium can be a permanent or rewritable memory within a respective device or located externally. A computer program can be also transferred to a respective device for example via a cable or a wireless link as a sequence of signals.

Data processing which may be performed according to embodiments of the invention can be realized by a computer program, that is by software, or by using one or more special electronic optimization circuits, that is in hardware, or in hybrid form, that is by means of software components and hardware components.

The explanations of various NetInf terms in the section "Background" also apply to exemplary embodiments of the invention.

The term "resolving node of a network of information" (or "public resolving node", more specifically public name resolver) may particularly denote a resolving node in a publicly accessible network of information such as the public Internet. A resolving node of a network of information may be abbreviated by RN1 ("first resolving node").

The term" resolving node of a secured network (or "secure resolving node" or "private resolving node", more specifically secure or private name resolver) may particularly denote a resolving node in a secure or secured network of information such as an intranet of a company or the like. A resolving node of a secured network may be abbreviated by RN2 ("second resolving node").

The term "node of secured network" may particularly denote a node having a performance as the above defined "publishing initiation node" and being located within a secured or private network.

The term "authentication node" (which may also be denoted as AAA server or AAA function) may particularly denote a node providing an authentication task. However, such an authentication node may optionally also provide the task of authorization and/or accounting. Sometimes an authentication node may be referred to as an authorization node, especially when providing authentication and authorization functionality.

In the following, further exemplary embodiments of the methods for a client node to access an information object located at a node of a secured network via a network of information will be explained. However, these embodiments also apply to the respective nodes, to the respective computer programs, and to the computer-readable medium product.

Next, further embodiments regarding the method to be performed at the routing node (or at the client node) will be explained.

In an embodiment, the request sent to the gateway node may comprise the information object identity. Thus the gateway node can unambiguously identify a corresponding information object. Alternatively or in addition, the gateway node can forward the received identity for corresponding information object identification at a node of the secured network.

At least one further information object identity may be related to the information object. In such a scenario, the method may further comprise receiving the further information object identity in conjunction with the reception of the locator, wherein the request may further comprise the further information object identity. By distinguishing between an object identity and a further information object identity, the achievable degree of security may be further increased since this allows to obfuscate the identity of a secured (e.g. private) information object for communication entities outside of the secured network.

The locator may be received by the routing node (and/or the client node) from the resolving node of the network of information. Such an embodiment is shown e.g. in FIGS. 1, 8, 11, 13, and 14 and shifts a large amount of the communication traffic on the network of information and apart from the secure private network.

In another embodiment, the locator may be received by the routing node (and/or the client node) from a resolving node (for instance a private name resolver) of the secured network. Such a scenario is shown in FIG. 9 and in FIG. 10.

Still referring to the previously described embodiment, the method may further comprise receiving from the resolving node of the network of information a message comprising information to access the resolving node of the secured network (compare for instance procedure is in FIG. 10), and sending a message to the resolving node of the secured network for requesting the locator (compare particularly procedure 2 in FIG. 10). Such an embodiment may allow to bypass the resolving node of the network of information for transmitting the locator.

The method may further comprise relaying content of at least one message related to an authentication of the client node towards an authentication node in the secured network. Such an authentication node may be provided for performing functions such as authentication, but optionally also authorization and/or accounting.

In an embodiment, the authentication may be performed via the gateway node after the locator is received. Hence, it is not necessary to provide a separate authentication node, since the authentication task may also be fulfilled by the gateway node allowing for a simple and low cost network architecture. Such an embodiment is shown in FIG. 13.

The authentication may be performed in a first procedure before the locator is received via the resolving node of the secured network and in a second procedure after the locator is received via the gateway node. It is mentioned that the first procedure is to authenticate in the resolve phase (this can be of advantage as if the client node is not legitimated then the complete procedure may be stopped already here) and the second procedure is to authenticate for the actual access via the gateway node to the desired information object. Such a two-phase authentication may provide a higher degree of data security.

In an embodiment, the client node and the routing node may be co-located. For instance, both nodes may be co-located at a client node such as a user terminal accessing the network of information. Such scenarios which can be implemented according to exemplary embodiments shown in FIG. 3 and FIG. 8 to FIG. 11 and FIG. 13 and FIG. 14. In other words, it is possible that the client node and the routing node are formed as different functional parts of a common node.

In an embodiment, the client node may be located at a terminal and the routing node may be located at a communication node of the network of information. Such a configuration is similar to the architecture shown in FIG. 4 which is not detailed out further in the detailed description but evidently can be applied to each of FIG. 8 to FIG. 11 and FIG. 13 and FIG. 14 when splitting up the client node into a (for instance user) terminal (comprising client node) and a first hop router FHR (comprising the routing node). In such an embodiment, client node and routing node may be different nodes which, however, can be communicatively coupled to one another.

Next, further embodiments of the method to be performed by the gateway node will be explained.

The request to the node of the secured network may comprise the received information object identity. This may for instance effect then the request to be in accordance with the received information object identity.

A further information object identity may be related to the information object. The method may then further comprise sending the received information object identity to a resolving node of the secured network, and receiving the further information object identity, wherein the request to the node of the secured network may comprise the further information object identity. This may for instance effect then the request to be in accordance with the received information object identity.

The method may further comprise an authentication of the client node towards an authentication node in the secured network via the gateway node. For instance, the gateway node may relay one or more messages for authentication between client node and the authentication node. As mentioned above, the authentication may be accompanied optionally by an authorization and/or an accounting task.

In the following, further embodiments of the method performed by the resolving node of the secured network will be explained.

A further information object identity may be related to the information object, wherein the resolving node of the secured network may perform a mapping from the information object identity to the further information identity. This may make it even more difficult for an attacker to get access to confidential information, since the identity of the information object within the secured network is not known to such an attacker and may be different from the identity of the information object outside of the secured network.

The information for enabling the resolving node of the network of information to initiate the procedure may comprise the locator of the gateway node. Such a gateway node may be a separate node or may be implemented as a part of a node providing the information object or in any other appropriate node.

The procedure may comprise a forwarding of the received information object identity to the resolving node of the secured network, wherein the method may further comprise receiving the forwarded information object identity, obtaining the locator based on the forwarded information object identity, and sending the obtained locator to the routing node. In such an embodiment, the locator can be sent directly to the routing node (as shown for instance in FIG. 1; FIG. 9 or FIG. 10 where the client node comprises the routing node show further direct sending embodiments) or indirectly via the resolving node of the network of information (as shown for instance in FIG. 8 or FIG. 11 where the client node comprises the routing node).

In an embodiment, the received forwarded information object identity may be received from the routing node. Such a scenario is shown, for instance in procedure 2 of FIG. 10 (where the client node comprises the routing node) and bypasses the resolving node of the network of information for the subsequent communication.

Still referring to one of the previously described embodiments, the obtained locator may be sent via the resolving node of the network of information to the routing node. Such an embodiment is shown for instance in FIG. 8 or FIG. 11.

The locator may be sent after an authentication of the client node to an authentication node of the secured network. Thus, it may be ensured that only authorized communication entities may receive this confidential information.

The method may further comprise relaying content of at least one message related to an authentication of the client node towards an authentication node of the secured network.

Next, further embodiments of the method to be performed at the resolving node of the network of information will be explained.

In such an embodiment, the information for enabling the resolving node of the network of information to initiate the procedure may comprise the locator of the gateway node and the initiating of the procedure may comprise a sending of the locator to the routing node.

Alternatively, the procedure may comprise a forwarding of the received information object identity to the resolving node of the secured network. Still referring to the previously described embodiment, a received information object identity may be forwarded via the routing node.

The method may further comprise relaying content of at least one message from the client node to the resolving node of the secured network related to an authentication of the client node towards an authentication node of the secured network.

Any one of the above-described nodes (such as routing node, client node, resolving node of the public/private network, node of secured network, gateway node), and/or a cache may comprise a receiving unit, a sending unit, a processing unit and/or a storage unit. A receiving unit may be a communication interface adapted for receiving a communication message, for instance in a wireless or wired manner. A sending unit may be a communication interface adapted for transmitting a communication message to a communicatively coupled communication partner device or entity, for instance in a wired or wireless manner. The receiving unit and the sending unit may also be combined to a transceiver unit performing both tasks of receiving and sending communication messages. A processing unit may be a device which has processing capabilities, e.g. can perform calculations. Such a processing unit may be realized as a microprocessor or central processing unit, CPU, for instance. A storage unit may be an electronic memory device which is capable of storing data. Examples for such a storage unit are a harddisk or a semiconductor storage device.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

FIG. 17A to FIG. 17D illustrate flow diagrams of methods according to exemplary embodiments of the invention.

DETAILED DESCRIPTION

Figure 1:
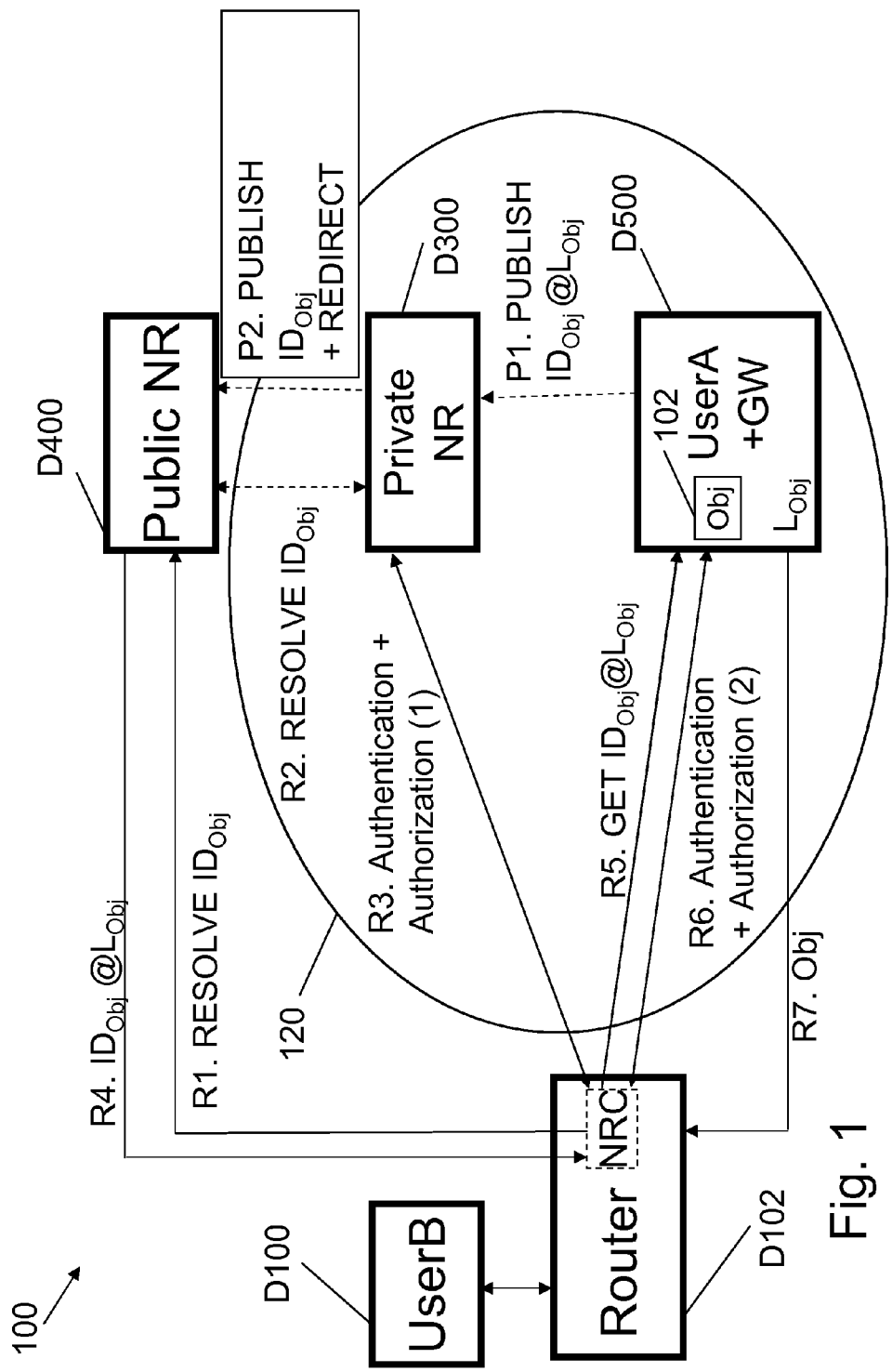
FIG. 1 illustrates a communication system according to an exemplary embodiment of the invention.
Figure 2:
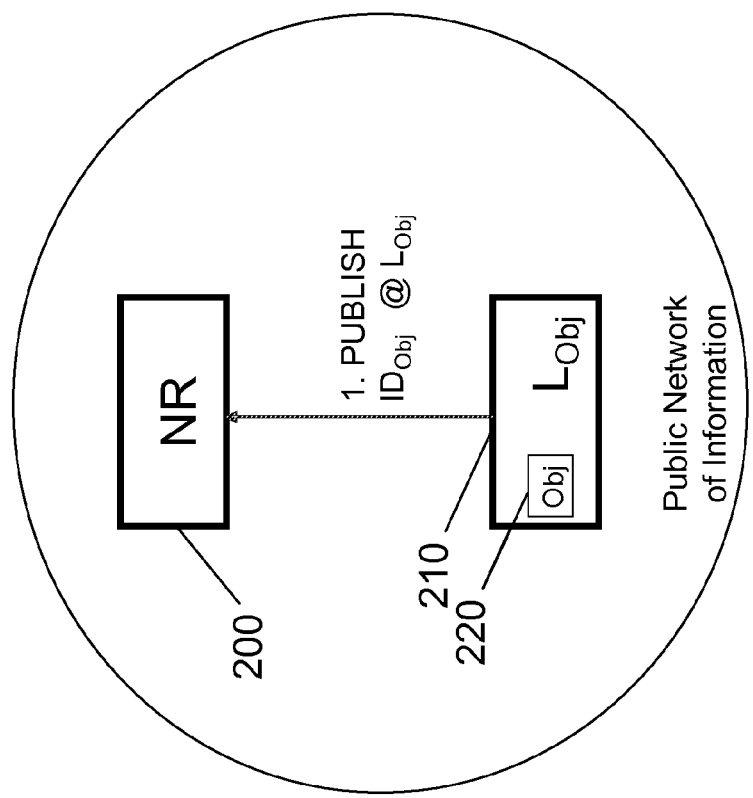
FIG. 2 illustrates a system of publishing information.

The illustration in the drawing is schematically. In different drawings, similar or identical elements are provided with the same reference signs.

According to an exemplary embodiment of the invention, a communication architecture may be provided rendering a Network of Information (NetInf) more secure. According to such an embodiment, any information available within a secured (e.g. private) network may be published on a name resolving node of the secured network. The information may be published in a public NetInf network as a redirected resolution, such that any information resolution request may be redirected from the resolving node of the network of information to the resolving node of the secured network. In addition, an identifier announced to the public network may be optionally obfuscated by replacing it with a proxy identifier. Together with the name resolving at the resolving node of the secured network, an authentication and authorization procedure may be initiated, which may ensure that the client node and the secured network of Information are mutually authenticated once the client node gets access to a requested information object. A gateway node between a public NetInf network and a private NetInf network may be responsible for enforcing an access restriction. Hence, additionally or alternatively to an encryption approach, a complementing method for restricting the distribution of information in a network is provided thereby improving the degree of data security.

An embodiment of the invention provides a gateway node between a public NetInf network and a private NetInf network, for instance, a company network. Any information available within the secured network may be published on the private name resolver of the secured network. To the public network, the information may be announced as being stored at the gateway node(s). In addition, the identifier announced to the public network may be obfuscated.

A client node may try to retrieve information from the gateway node. After attempting to get the information object from the gateway node, an authentication procedure may take place, initiated by the gateway node. After successfully finishing this procedure, the gateway node may retrieve the desired information object from the secured network on behalf of the user.

Hence, an embodiment of the invention may add a "second line of defense" to data security in Networks of Information. Instead of relying on a strong encryption of the actual information object as the only way of controlling access, an embodiment of the invention may also restrict the distribution of the information objects.

Procedures according to exemplary embodiments of the invention in the network are compatible with envisioned standard procedures. A "redirect to other resolving node" function may be implemented as well. In addition to the usual mapping identifier→identifier and identifier→locator, additional sets of binding types for the resolving can be implemented, e.g. a binding type that permits binding an identifier to a resolving node, i.e., that supports redirecting a request to another resolving node.

In the following, referring to FIG. 1, a communication procedure according to an exemplary embodiment of the invention will be explained.

FIG. 1 illustrates a network of information 100 having a non-private publicly available region illustrated outside of a circle 120, wherein an interior of the circle 120 illustrates a private (or secured) network of information.

In the described scenario, a node D500 of the secured network (which may also denoted as a publishing initiating node) may store an object of information 102 which may be identified by an identifier $ID_{Obj}$ and which may be spatially characterized by a locator $L_{Obj}$. Since, as will be explained in the following, this node D500 of the secured network (which may also be denoted as user A device) also fulfils the task of a gateway node in the described embodiment, an indication "GW" is assigned to the node D500 of the secured network in FIG. 1. Hence, according to this specific example, the locator $L_{Obj}$ can be equal to a locator $L_{GW}$ pointing to the location of the gateway node. In other words, as node D500 acts also as a gateway node, a location of an information object may be identified by $L_{GW}$ i.e. $L_{GW}=L_{Obj}$.

When the node D500 of the secured network initiates publishing the availability of the information object 102 at this node D500 of the secured network, a publishing message P1 is sent to a resolving node D300 of the secured (or private) network 120.

In the shown scenario, a client node (which may also denoted as a user B device or as an information object retrieving node) D100 may try to get access to the information object 102. In communication with a routing node D102, this goal can be achieved as will be explained in the following. As an alternative to the architecture shown in FIG. 1, the client node D100 and the routing node D102 being arranged as separate entities in FIG. 1 may be co-located and may form a common unit (see FIG. 15).

Coming back to the secured network of information 120, the published information can be forwarded by a publishing message P2 from the resolving node D300 of the secured network of information 120 to a resolving node D400 of the network of information 100 which resolving node D400 is located outside of the secured network of information 120, but within the public network of information 100. A communication between resolving node D300 and resolving node D400 may instruct the resolving node D400 to redirect requests regarding the object 102 to the resolving node D300.

To resolve identifier $ID_{Obj}$ of the information object 102 and its locator $L_{Obj}$, a name resolving client (NRC) is located on the routing node D102. When the routing node D102 resolves the identity of the information object $ID_{Obj}$ with a message R1, the resolving node D400 forwards, in a communication message R2, such a request to the resolving node D300. An authentication and authorization procedure, compare communication R3, may be performed between the resolving node D300 and the client node D100 to verify whether the client node D100 has the authorization to access the information object 102. Note that the authentication and authorization may also be requested by routing node D102 on behalf of client node D100 using credentials, e.g., user name and password supplied by client node D100 denoted also as user B device. When the result of this authentication and authorization is positive, corresponding information may be communicated from the resolving node D300 to the resolving node D400.

Subsequently, in a communication message R4, the resolving node D400 may send the information that the information object 102 is located at the position of the node D500 of the secured network to the routing node D102, i.e. it sends locator $L_{Obj}$. With this information, the routing node D102 may then get access to the information object 102 by sending a corresponding communication message R5 to the node D500 of the secured network. The node D500 of the secured network may then check authentication and authorization of the client node D100 in a communication procedure R6. If the result of also this authentication and authorization is positive, the desired object of information 102 is sent from the node D500 of the secured network (serving as well as a gateway node in the described embodiment) to the routing node D102 in a communication message R7.

Figure 3:
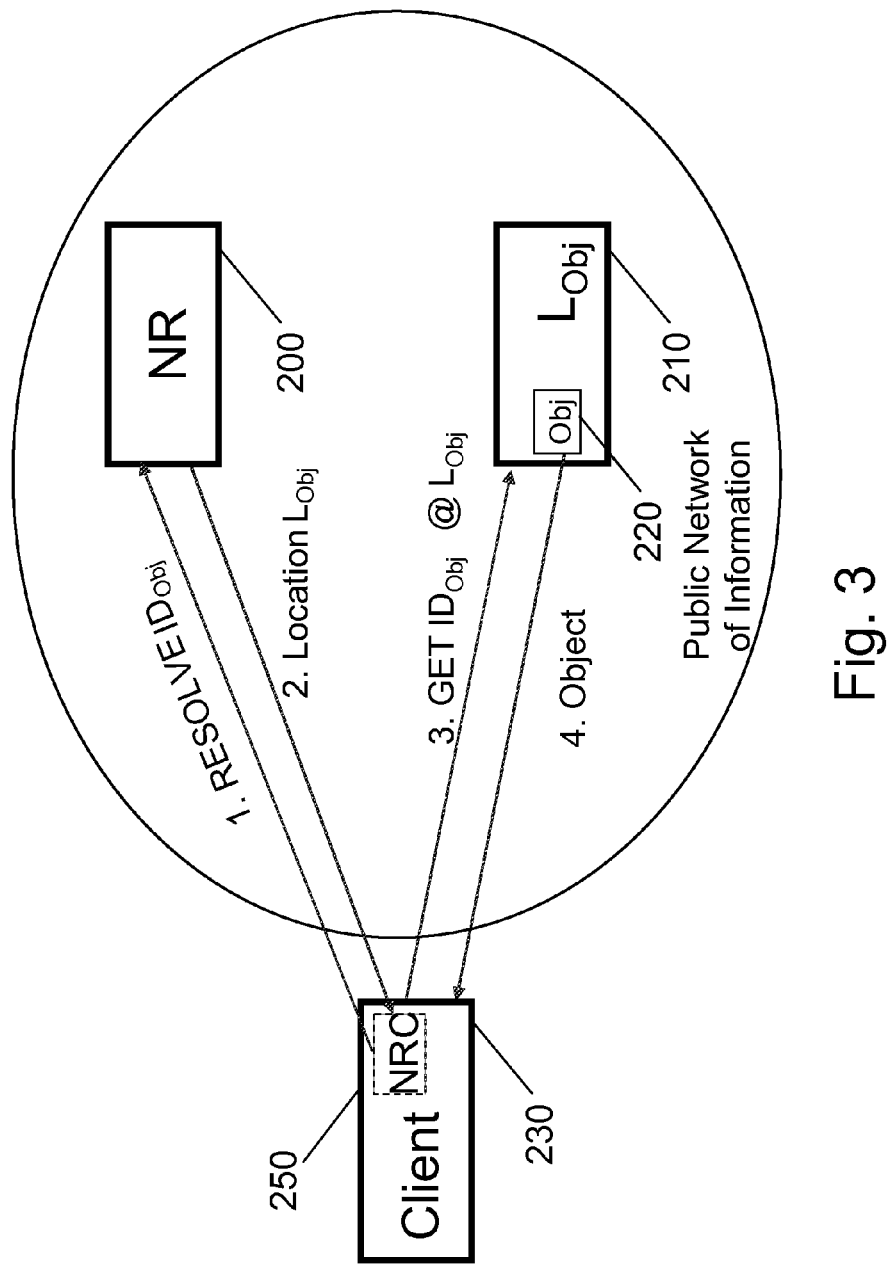
FIG. 3 illustrates a system of information retrieval.
Figure 4:
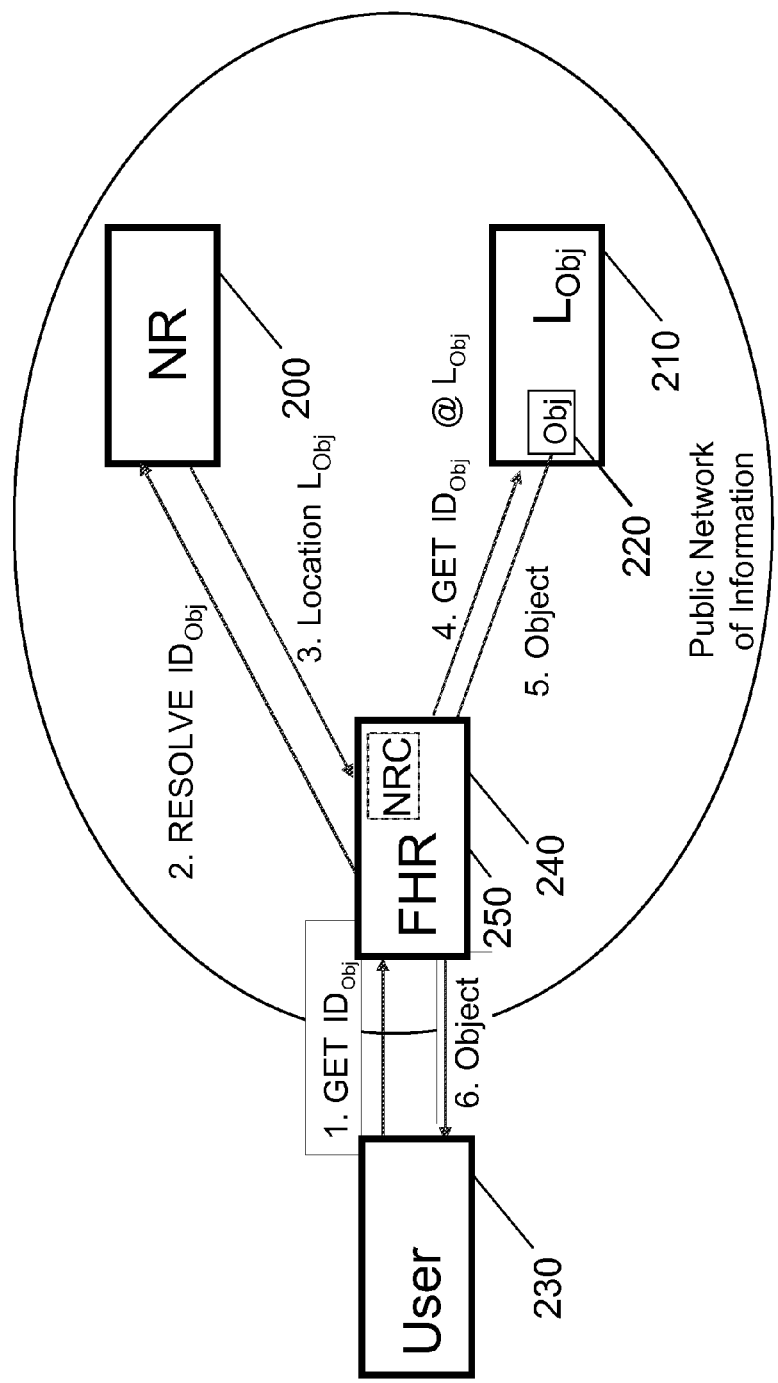
FIG. 4 illustrates another system of information retrieval.
Figure 5:
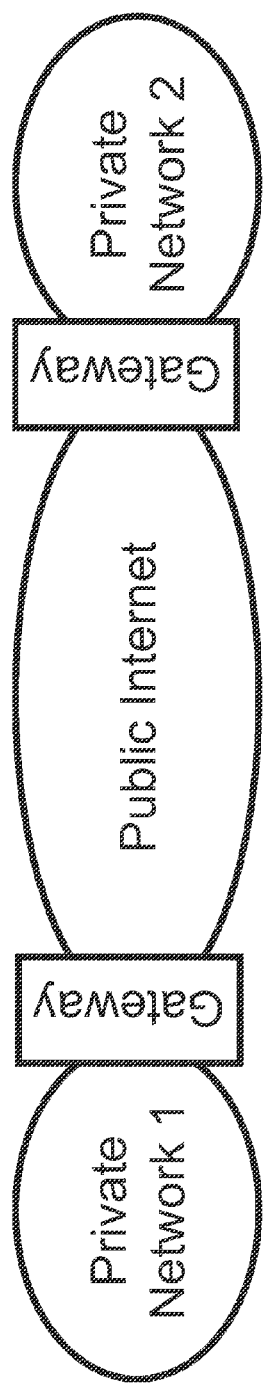
FIG. 5 illustrates a system of partitioning of the Internet.
Figure 6:
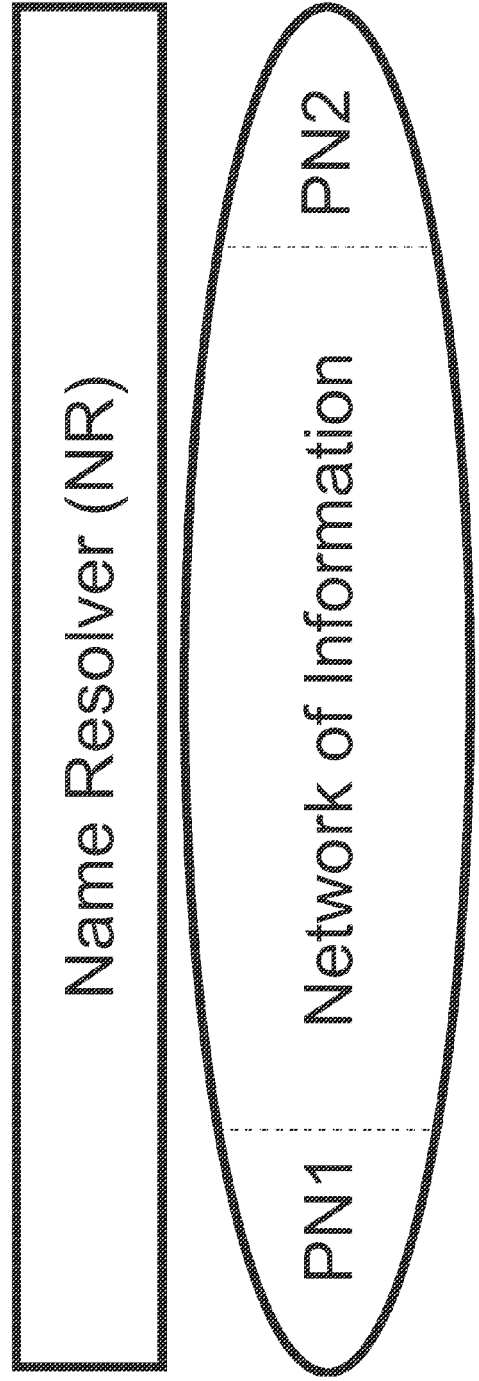
FIG. 6 illustrates a system of "virtual partitioning" in a Network of Information.

Nodes D100, D102 in FIG. 1 are configured similar to nodes 230 and 240 of FIG. 4. An NRC may be implemented in the client node D100 (similarly as in FIG. 3) or in a routing node such as an FHR (similarly as in FIG. 4).

More generally, a method according to an exemplary embodiment of the invention can be split into two phases: Publishing the information object and retrieving it. In the following, these phases will be described in more detail.

Figure 7:
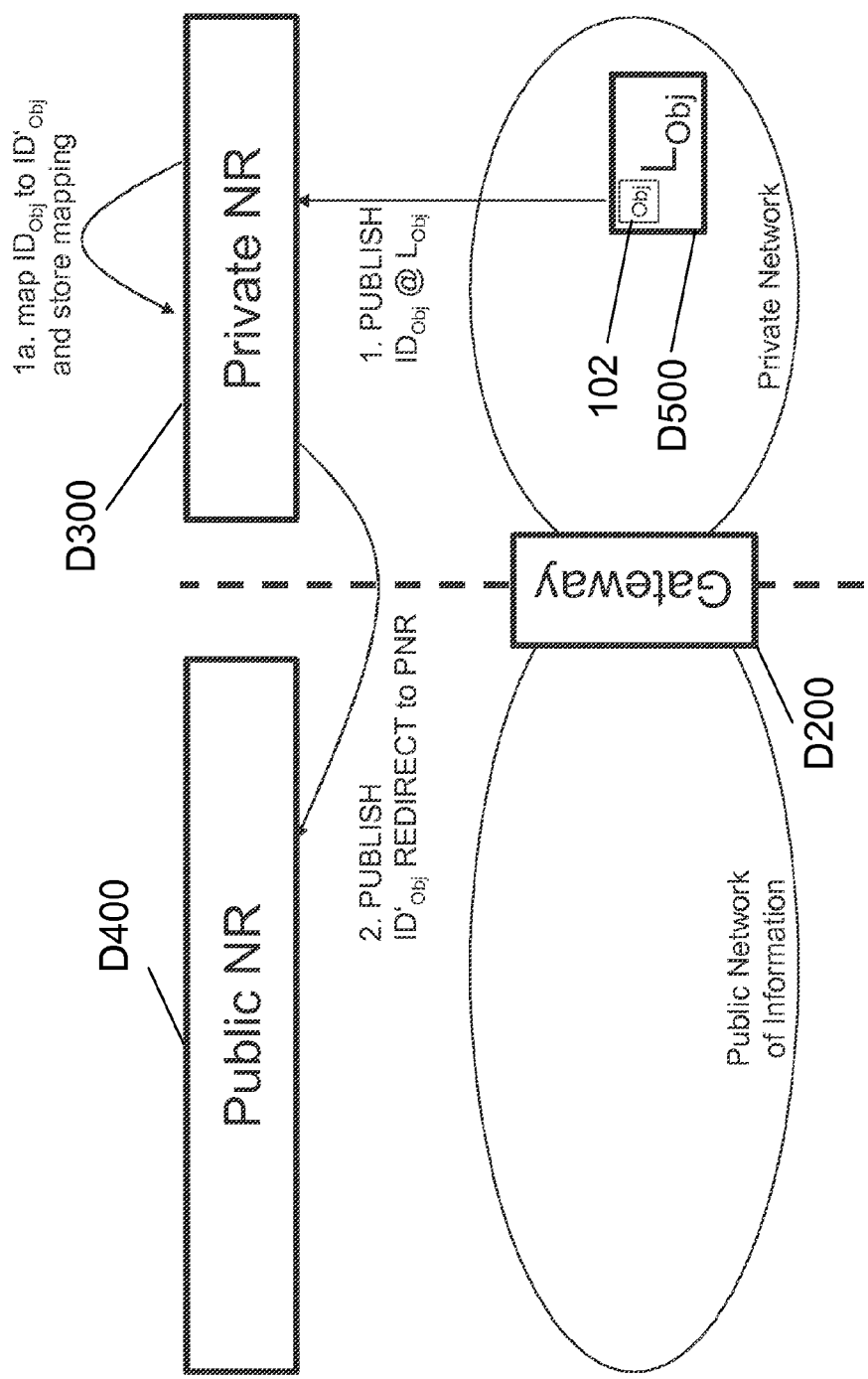
FIG. 7 illustrates a publish phase of a method according to an exemplary embodiment of the invention.

A process of publishing an information object as shown in FIG. 7 is initiated by a node D500 of the secured network (or host) (acting as publishing initiation node) that wants to announce to a resolving node D300 that an information object 102 with a certain identifier $ID_{Obj}$ is available at the node D500 of the secured network with a location $L_{Obj}$. In this case, it is assumed that the information object 102 to be published is a private object. Therefore it is published at the resolving node D300 (see step 1 in FIG. 7). In order to also enable users in the public network (such as a traveling colleague who does have access to the company network) to access the information object 102 (e.g. a secured file), the resolving node D300 registers $ID_{Obj}$ to the resolving node D400 such that any resolving requests for $ID_{Obj}$ arriving at the resolving node D400 will be redirected to the resolving node D300 (step 2). The capability of redirecting a request can be added to the name resolving service as an additional binding type.

Optionally, the resolving node D300 may decide to publish an alternate proxy identifier $ID'_{Obj}$ instead of the original identifier $ID_{Obj}$ and store the mapping from the proxy identifier $ID'_{Obj}$ to $ID_{Obj}$, locally. This allows to further enhance the privacy level. Without this option, $ID'_{Obj}$ is equal to $ID_{Obj}$.

After the publish phase outlined above, the following resolving steps can now be performed:

At resolving node D400, the requested identifier is resolved into a redirection to the resolving node D300 based on the information received in step 2. At resolving node D300, the obfuscated $ID'_{Obj}$ is resolved into the actual $ID_{Obj}$ based on data stored during the translation. Then, $ID_{Obj}$ is resolved into the storage location $L_{Obj}$ based on the information received in step 1.

This can be summarized as follows:

1.) resolving node D400:

a) $ID_{Obj} \rightarrow$ REDIRECT: Resolve the requested identifier into a redirection to the resolving node D300 (based on the information received in step 2)

2.) resolving node D300:

a) $ID'_{Obj} \rightarrow ID_{Obj}$: Resolve the obfuscated $ID'_{Obj}$ into the actual $ID_{Obj}$ (based on data stored during the translation)

b) $ID_{Obj} \rightarrow L_{Obj}$: Resolve $ID_{Obj}$ into the storage location $L_{Obj}$ (based on the information received in step 1). This is for instance used prior to step 8 in FIG. 8 mentioned below.

Figure 8:
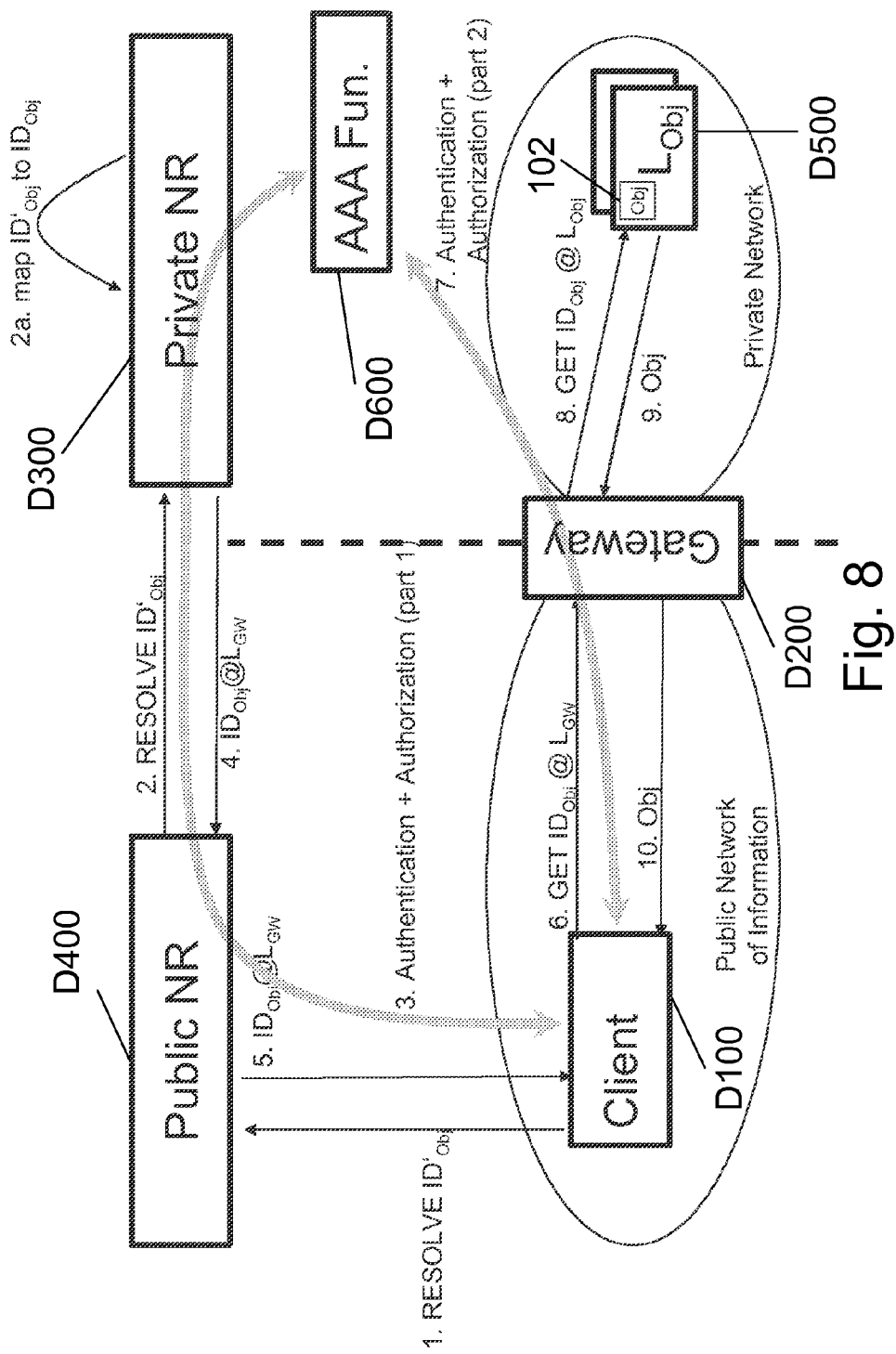
FIG. 8 illustrates a retrieval of information located in a secured network using name resolving redirection of a method according to an exemplary embodiment of the invention.

Regarding the retrieval phase, reference is made to FIG. 8.

The first step a client node D100 has to perform in order to retrieve the private object with the identifier $ID'_{Obj}$ is to contact the resolving node D400 to obtain a suitable storage location (step 1 in FIG. 8). The resolving node D400 has an entry stating that resolving requests for $ID'_{Obj}$ shall be redirected to the resolving node D300 (step 2). A mapping of $ID'_{Obj}$ to $ID_{Obj}$ may then be performed by the resolving node D300. The resolving node D300 then initiates a first part of an authentication and authorization procedure with the client node D100 (step 3) utilizing an authentication, authorization and accounting (AAA) function. The AAA function may be provided by a dedicated authentication node D600 or it may be collocated with the resolving node D300 or even with the gateway node D200. Any secure and reliable mutual authentication may be used. Examples are UMTS AKA or GBA (as defined in 3GPP specification TS 33.102, 3G Security, Security architecture, Release 8, version 8.0.0, available online at http://www.3gpp.org/ftp/specs/html-info/33102.htm; 3GPP specification TS 33.220, Generic Authentication Architecture (GAA), Generic bootstrapping architecture, Release 8, version 8.3.0, available online at http://www.3gpp.org/ftp/specs/html-info/33220.htm) or Kerberos. Note that it not always necessary to complete the full mutual authentication already in step 3, as the authentication may be continued in step 7 in which a second part of the authentication is performed. A completed authentication in step 3 may or may not be reused in step 7.

The location resolving step is then finalized and the location of the gateway node D200 $L_{GW}$ is returned to the client node D100 via the public NR D400 (steps 4+5). In more detail, step 4 relates to a communication from resolving node D300 to resolving node D400, and step 5 relates to a subsequent communication from resolving node D400 to client node D100. This informs the client node D100 that the desired information object Obj is available from the gateway node D200.

Alternative procedures (partly) bypassing the resolving node D400 are outlined below (see for instance FIG. 9).

Coming back to FIG. 8, the client node D100 now (i.e. after step 5) contacts the gateway node D200 to retrieve the information object 102 (steps 6 to 10). In step 6, the client node D100 sends a request to the gateway node D200 to provide the information object 102. Before providing the information object 102 to the client node D100, the authentication which has been started in step 3 may be completed using the authentication node D600 (step 7). Hence, at this point in time, the gateway node D200 may have to validate authorization/complete the authentication (step 7), possibly reusing credentials or parts of the credentials obtained in step 3. In step 8, the gateway node D200 requests the information object 102 from the node D500 of the secured network. In a step 9, the node D500 of the secured network responds to this request by transmitting the information object 102 to the gateway node D200 which forwards the information object 102 to the client node in step 10.

An alternative option where the gateway node D200 coincides with the storage location is presented below.

Next, further options for name resolving redirection will be explained.

Figure 9:
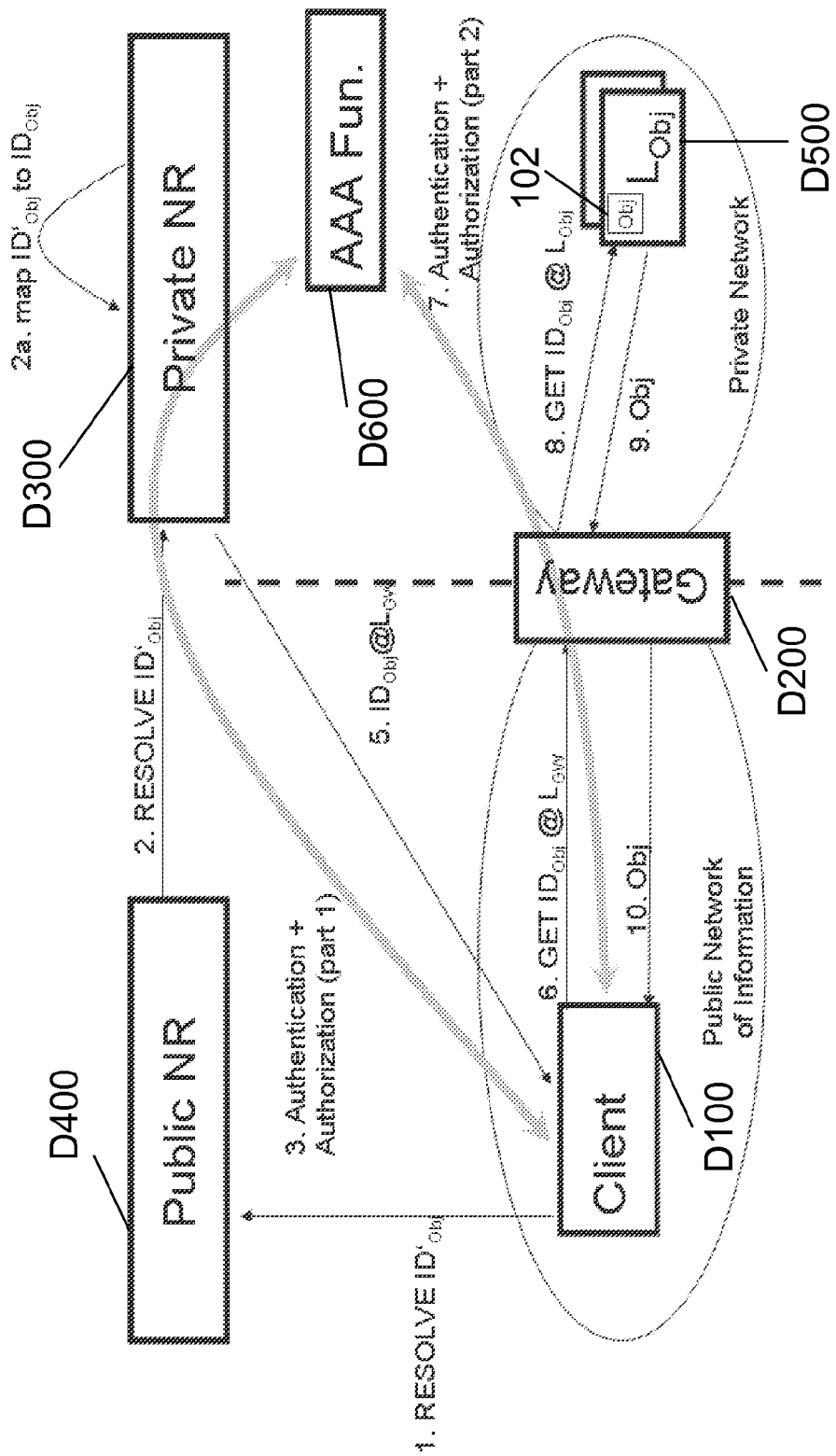
FIG. 9 illustrates an authentication and authorization and response from a resolving node of a secured network without involvement of a resolving node of a public network of a method according to an exemplary embodiment of the invention.

FIG. 9 depicts an alternative name resolving redirection. Here, the authentication and authorization procedure (step 3) and the reply from the resolving node D300 (step 5) bypass the resolving node D400 and go directly to the client node D100. The return address for message 5 may be contained in the initial request (steps 1 and 2).

Figure 10:
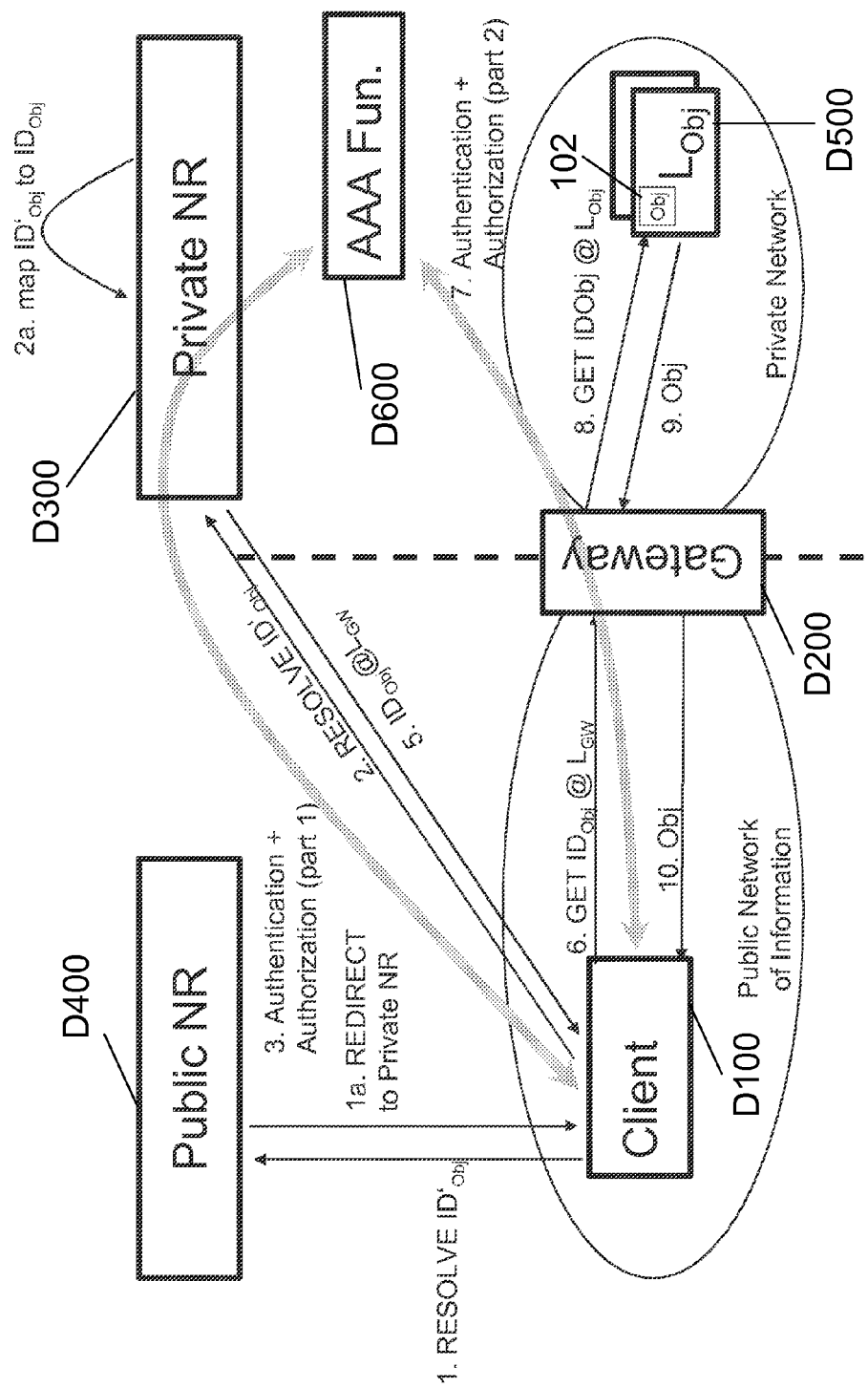
FIG. 10 illustrates explicit redirection information sent from the resolving node of a public network to the resolving node of a secured network of a method according to an exemplary embodiment of the invention.

FIG. 10 depicts an alternative name resolving redirection. The client node D100 is explicitly informed by the resolving node D400 that the request has to be redirected to the resolving node D300 (step 1a). Afterwards, the client node D100 contacts the resolving node D300 in order to resolve the requested ID (step 2). All communication between client node D100 and resolving node D300, i.e., the second resolve request (step 2), authentication and authorization procedure (step 3) and the reply from the resolving node D300 (step 5) bypass the resolving node D400 and go directly to the client node D100. This method provides the additional benefit that the resolving node D400 can be a legacy implementation.

Next, a gateway co-located with an information object location will be described.

Figure 11:
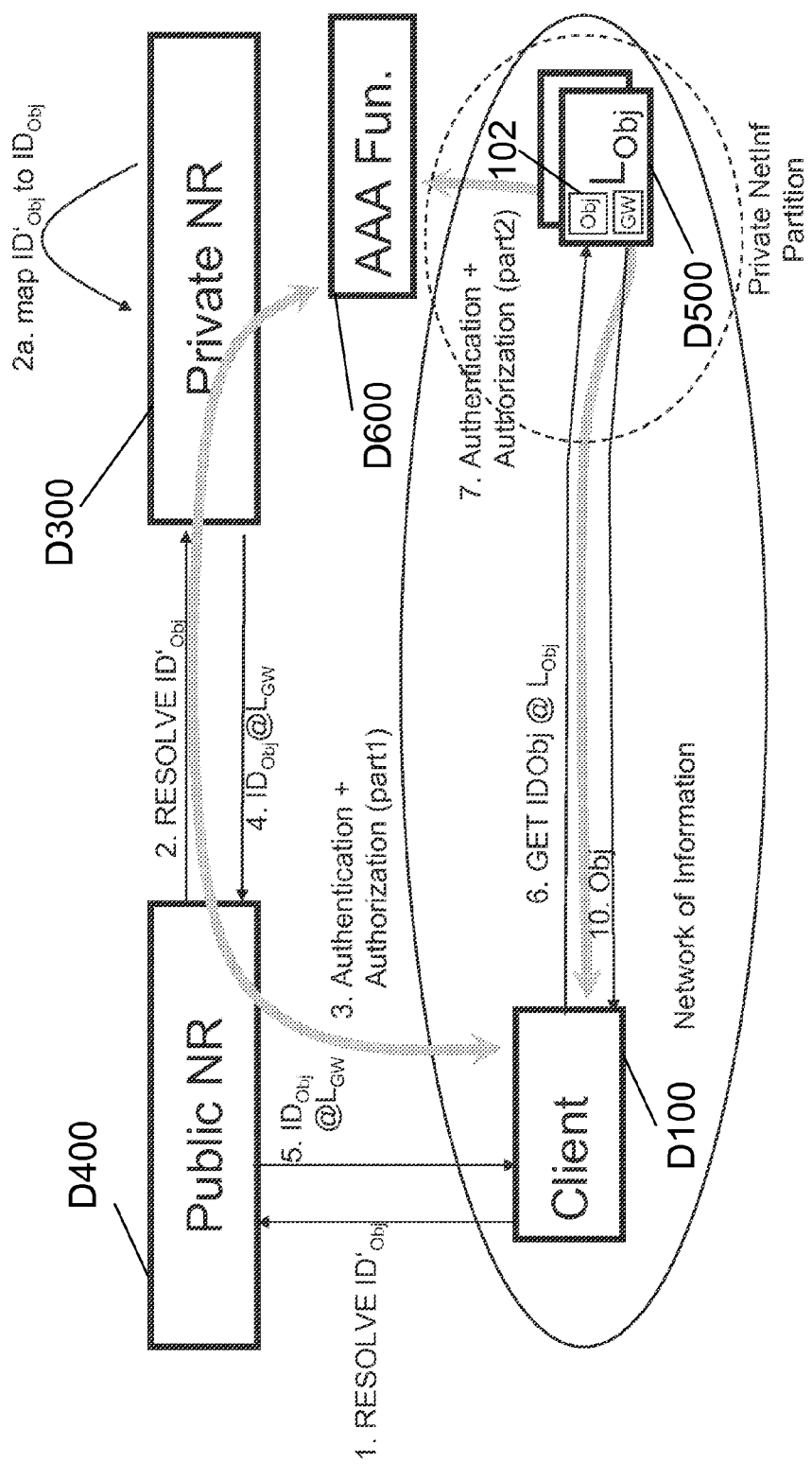
FIG. 11 illustrates co-location of gateway node and object location of a method according to an exemplary embodiment of the invention.

As shown in FIG. 11, a separate or stand-alone gateway node D200 may be omitted. Instead, the node D500 of the secured network, i.e. the entity that stores the request information object 102, may perform an authentication when the client node D100 accesses the requested information object 102. Also for this case, the name resolving redirection may alternatively be performed as described above. Hence, in FIG. 11, the gateway node is collocated with the node D500 of the secured network (compare box "GW" in FIG. 11, similar as in FIG. 1). The collocated gateway node provides the same functionality as the gateway node D200 in the above described embodiments (see particularly FIG. 8 to FIG. 10).

Next, authentication and authorization embodiments will be explained.

As stated before, the embodiments described here shall not be limited to a specific authentication algorithm. However, some exemplary mappings to well known authentication schemes will be given in order the show that the embodiments are feasible, and that proven authentication algorithm are well applicable.

In concrete terms, the communication summarized in steps 3 and 7 above will be further detailed. For simplicity, the explanation will stick to the name resolving redirection option depicted in FIG. 10, however, the described methods can equivalently be used with the other redirection options.

In the following, full digest AKA authentication in step 3 with re-use in step 7 will be explained.

Digest AKA authentication is standardized in 3GPP specification TS 33.102, 3G Security, Security architecture, Release 8, version 8.0.0, available online at http://www.3gpp.org/ftp/specs/html-info/33102.htm and can easily be applied, here, similar to IETF specification, RFC 3310, HTTP Digest Authentication Using AKA, available online at http://www.ietf.org/rfc/rfc3310.txt. Successful digest AKA authentication ensures mutual authentication based on a shared secret between the client node D100 and the authentication node D600.

Using Digest AKA, the resolving node D300 will respond to the resolve request (step 2) in FIG. 10 with a message indicating that the access is unauthorized. This message contains an authentication token AUTN and a challenge RAND, which are both generated by the authentication node D600. Together with AUTN and RAND, the authentication node D600 sends to the resolving node D300 the expected response of the client XRES. Exploiting AUTN, RAND and his own shared secret, the client node D100 computes his response value RES. Next, the client node D100 resends the resolve request (repeat step 2) to the resolving node D300 including a digest value generated based on RES. The resolving node D300 compares the digest in the client's request with the digest based on XRES. If the comparison is successful, the client node D100 is authenticated and the resolving node D300 sends the name resolving information to the client node D100 (step 5), including a digest based on XRES. The client node D100 checks the authenticity of the resolving node D300 comparing this digest with his one based on RES. This concludes the mutual authentication.

The authentication established in step 3 can be reused in step 6. Using the mechanism described in IETF specification, RFC 3310, HTTP Digest Authentication Using AKA, available online at http://www.ietf.org/rfc/rfc3310.txt, RES can be used to generate another digest which can be included in the GET (step 6). In step 7, the gateway node D200 contacts the authentication node D600 to obtain the XRES value in order to verify the client node's D100 request, analogously to the resolving node D300, before. To complete the mutual authentication, the gateway node D200 may include its digest response based on XRES in step 10.

Alternatively, the gateway node D200 can reply with an "access unauthorized" message in order to initiate a complete new authentication as described before. Note that in both cases the client node D100 and both, the gateway node D200 and the resolving node D300, are mutually authenticated.

In the following, digest AKA authentication split between steps 3 and 7 will be described.

Digest AKA authentication as described above may alternatively be split between steps 3 and 7. This provides the advantage that all authentication traffic may be piggybacked on messages 2, 5, 6 and 10. That is, the resolving node D300 may respond on the resolve request (step 2) with a location (step 5). The location message (step 5) may contain AUTN and RAND. After calculating RES, the client node D100 may include its digest response based on RES in the GET (step 6). As before, the gateway node D200 may acquire XRES from the authentication node D600 to authenticate the GET. Provided this authentication succeeds, the gateway node D200 may send the object 102 (step 10), including the authorization response based on XRES.

An advantage of this method is that no additional messages are necessary for authentication.

In the following, a Kerberos based authentication will be described.

Kerberos (compare IETF specification, RFC 4120, The Kerberos Network Authentication Service (V5), available online at http://www.ietf.org/rgc/rfc4120.txt) is widely used in computer networks to authorize access for services. When applying Kerberos here, the client node D100 may perform the following actions in step 3:

Firstly, client node D100 may authenticate towards the authentication node D600 (Authentication Server in Kerberos terminology) using credentials, e.g., username and password. Then, client node D100 may request access (ticket) for resolving node D300 and gateway node D200 from authentication node D600 (Acting as Ticket Granting Server in Kerberos terminology). Then, client node D100 may provide a (derived) ticket to resolving node D300 to get access to the location.

After obtaining the gateway node D200 location, the client node D100 may provide the (derived) ticket to the gateway node D200 in step 6 to get access to the object 102.

A main difference with Kerberos based authentication compared to the previous case is that Kerberos does not require any message exchange between the gateway node D200 and the authentication node D600. However, it still provides secure mutual authentication.

In the following, a further embodiment of a method will be described which can be split as well into the two phases of publishing the information object and retrieving it.

Figure 12:
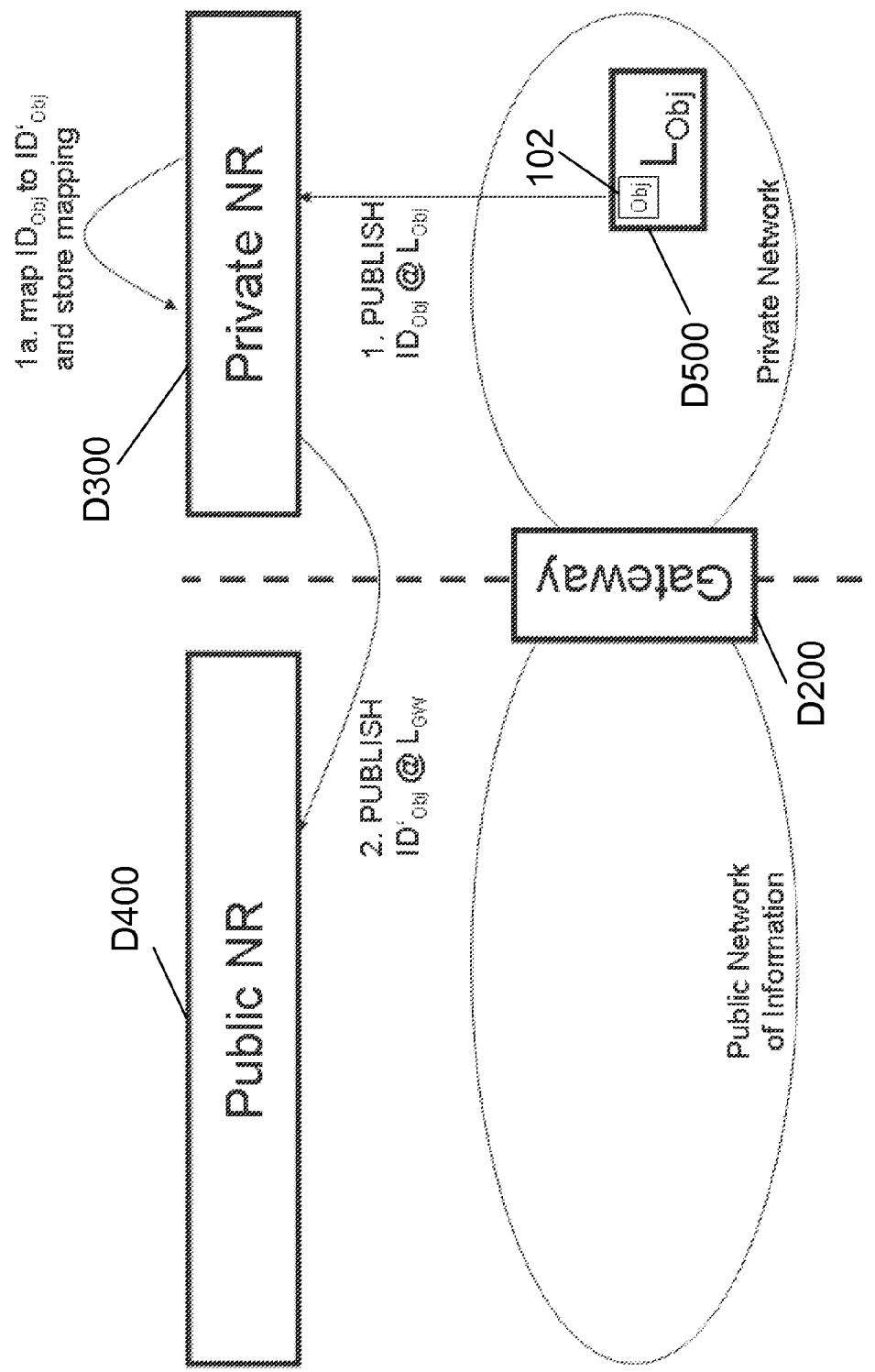
FIG. 12 illustrates a publish phase of a method according to another exemplary embodiment of the invention.

According to such an embodiment, the publish phase may be as shown in FIG. 12.

The process of publishing an information object 102 may be initiated by a node D500 of the secured network (acting as publishing initiation node) that wants to announce to a resolving node D300 that an information object 102 with a certain identifier $ID_{Obj}$ is available at a the node D500 of the secured network with a location $L_{Obj}$. In this case, it is assumed that the information object 102 to be published is a private object. Therefore it is published at the resolving node D300 (see step 1 in FIG. 12). In order to also enable users in the public network (such as a traveling colleague who does have access to the company network) to access the information object 102 (e.g. a secured file), the resolving node D300 propagates the request to the resolving node D400, stating the location of the gateway node D200 $L_{GW}$ instead of the location of the actual object 102 (step 2).

Optionally, the resolving node D300 may decide to publish an alternate proxy identifier $ID'_{Obj}$ instead of the original identifier $ID_{Obj}$ and store the mapping from the proxy identifier $ID'_{Obj}$ to $ID_{Obj}$, locally. This allows to further enhance the privacy level. Without this option, $ID'_{Obj}$ is equal to $ID_{Obj}$.

If, for instance for scalability reasons, the secured network has multiple gateway nodes D200, they can be propagated to the resolving node D400 as additional storage locations. The mechanisms in the network then take care of routing the request to the closest gateway node D200.

In principle, $L_{Obj}$ and $L_{GW}$ can also be the same, i.e. the gateway node D200 can be located on the node D500 of the secured network (i.e. gateway node D200 and node D500 of the secured network may be collocated so that a separate or stand-alone gateway node is not necessary) holding the information object 102, or the information object 102 can be stored or cached at the gateway node D200 (see FIG. 1 or 11). In a setup where sensitive data is to be protected, the scenario outlined above can however be regarded as a realistic case.

After the publish phase outlined above, the following resolving steps can now be performed:

The resolving node D400 may resolve the requested identifier into the location of the gateway node D200 based on the information received in step 2.

The resolving node D300 may resolve the obfuscated $ID'_{Obj}$ into the actual $ID_{Obj}$ based on data stored during the translation, and may then resolve $ID_{Obj}$ into the storage location $L_{Obj}$ based on the information received in step 1.

In other words:

3.) resolving node D400 a) $ID'_{Obj} \rightarrow L_{GW}$ Resolve the requested ID into the location of the gateway node D200 (based on the information received in step 2)

4.) resolving node D300 a) $ID'_{Obj} \rightarrow ID_{Obj}$: Resolve the obfuscated $ID'_{Obj}$ into the actual $ID_{Obj}$ (based on data stored during the translation)

b) $ID_{Obj} \rightarrow L_{Obj}$: Resolve $ID_{Obj}$ into the storage location $L_{Obj}$ (based on the information received in step 1). This is for instance used prior to step 8 in FIG. 13.

Figure 13:
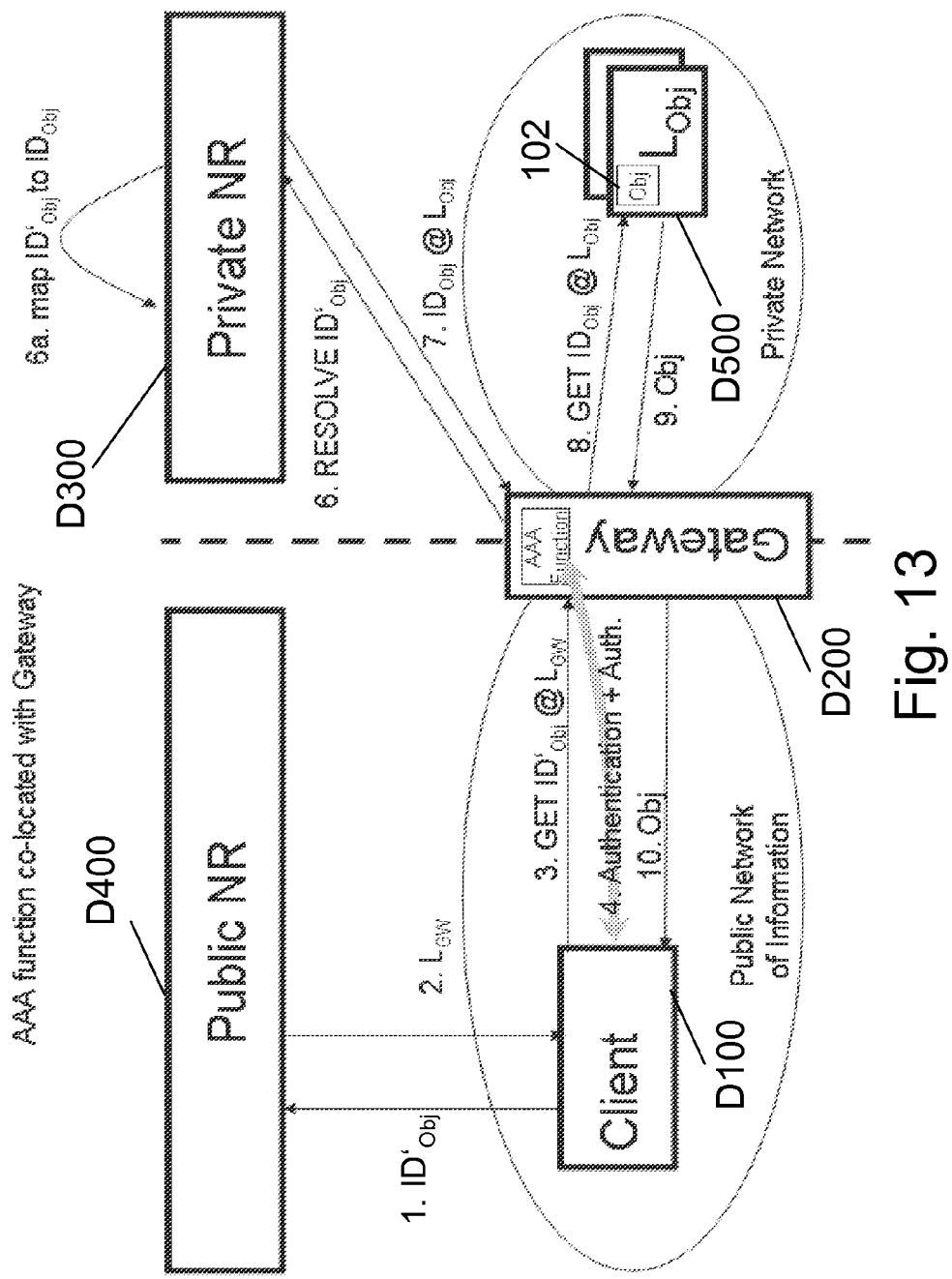
FIG. 13 illustrates a retrieval of information located in a secured network of a method according to an exemplary embodiment of the invention.

Next, the retrieval phase as depicted in FIG. 13 will be explained.

The first step a client node D100 has to perform in order to retrieve the private information object 102 with the identifier $ID'_{Obj}$ is to contact the resolving node D400 to obtain a suitable storage location (step 1 in FIG. 13). Corresponding to the publish procedure described above, the resolving node D400 returns the locator $L_{GW}$ indicating the location of the gateway node D200 (step 2). The client node D100 now contacts the gateway node D200 to retrieve the information object (step 3), assuming that the gateway node D200 is the actual storage location.

The client node D100 may be capable of performing an authentication and authorization procedure with the gateway node D200 (step 4), much as a virtual private network (VPN) client does today. The client node D100 may belong to a certain organization which offers the access to its secured network via a gateway node D200. Any secure authentication method may be used, for instance, UMTS AKA or GBA (as defined in 3GPP specification TS 33.102, 3G Security, Security architecture, Release 8, version 8.0.0, available online at http://www.3gpp.org/ftp/specs/html-info/33102.htm or 3GPP specification TS 33.220, Generic Authentication Architecture (GAA), Generic bootstrapping architecture, Release 8, version 8.3.0, available online at http://www.3gpp.org/ftp/specs/html-info/33220.htm, respectively), which are based on a shared secret. Alternatively, certificate based asymmetric authentication may be used. In FIG. 13, the AAA Function, which handles authentication and authorization, is depicted as a part of the gateway node D200.

Figure 14:
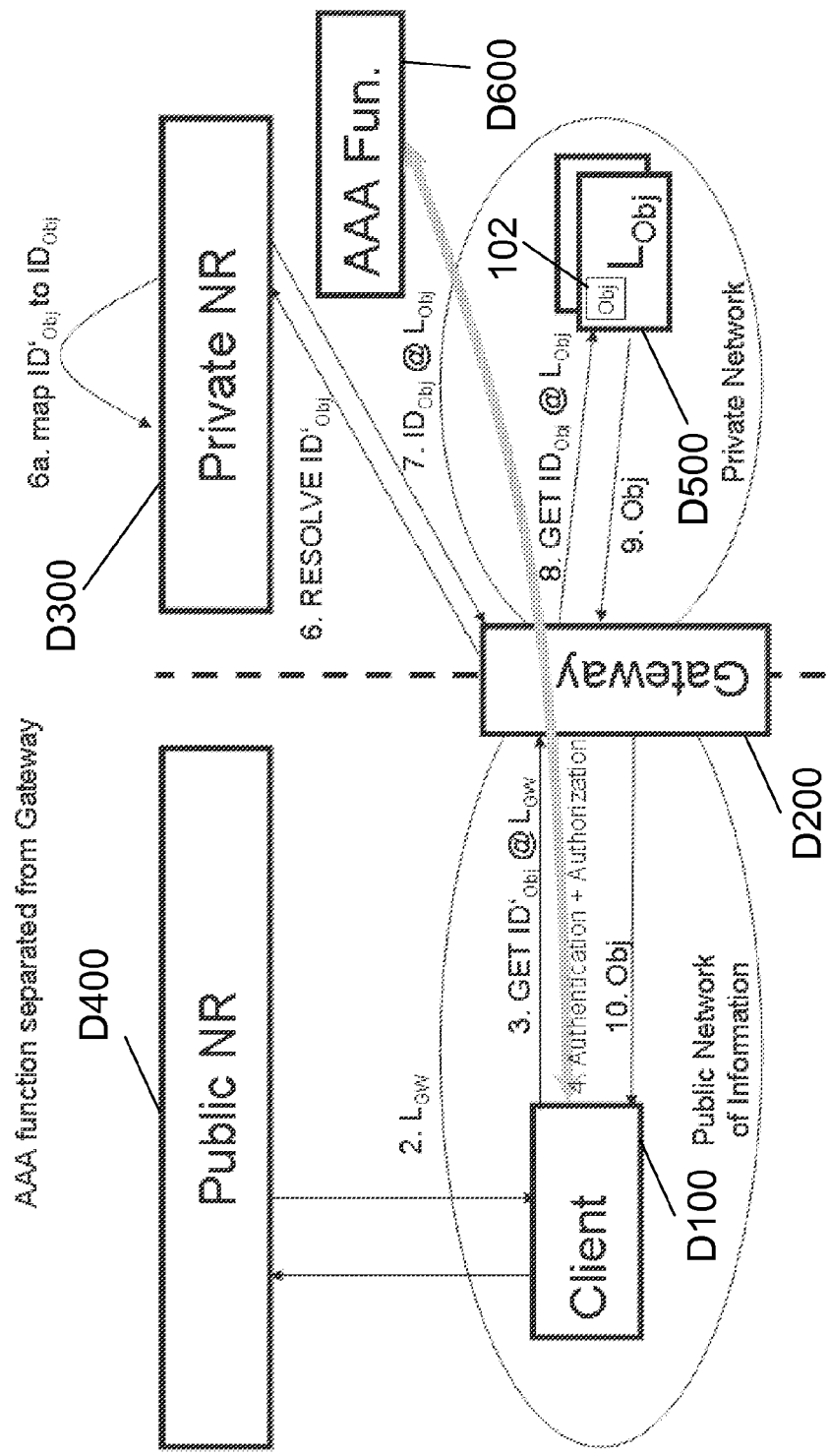
FIG. 14 illustrates a retrieval procedure according to an exemplary embodiment of the invention similar to FIG. 13 but with an authentication function separate from a gateway node.

To be more flexible with respect to different deployment options, the AAA Function may also be a separate entity, i.e. authentication node D600, located in the secured network, as illustrated in FIG. 14.

After successful authentication, the gateway node D200 obtains a location of the requested information object in the secured network from the resolving node D300 (steps 6 and 7). The resolving node D300 maps the proxy identifier $ID'_{Obj}$ to $ID_{Obj}$ (step 6a) and returns it together with the locator $L_{Obj}$ indicative of the location of the information object, provided this optional obfuscation feature is used. Afterwards, the gateway node D200 retrieves the information object 102 from this location (steps 8 and 9). Finally, the gateway node D200 returns the information object 102 to the client node D100 (step 10) in response to the request in step 3. It is mentioned that steps 9 and 10 can be combined and the information object may be directly sent to the client node D100 without passing via the gateway node D200.

If the authentication in step 4 fails, the gateway node D200 may for instance return an error condition or silently ignore the request. In this case the information object does not even leave the secured network, whereas in conventional systems, the information object would be delivered without the additional authentication in step 4 and the encryption together with appropriate key management would be the only "line of defense" against unauthorized access.

Figure 15:
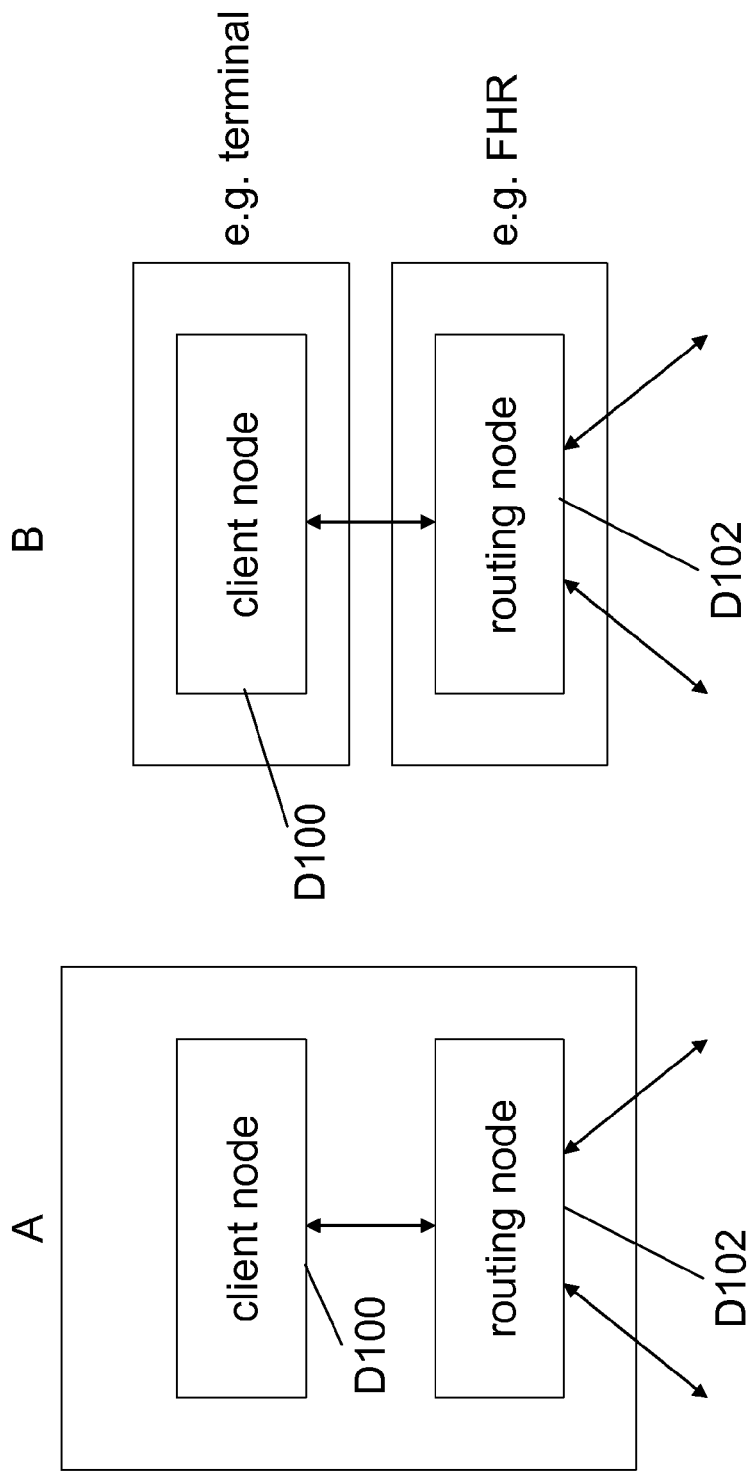
FIG. 15 illustrates a co-located (A) and a distributed (B) architecture of client node and routing node according to exemplary embodiments of the invention.
Figure 16:
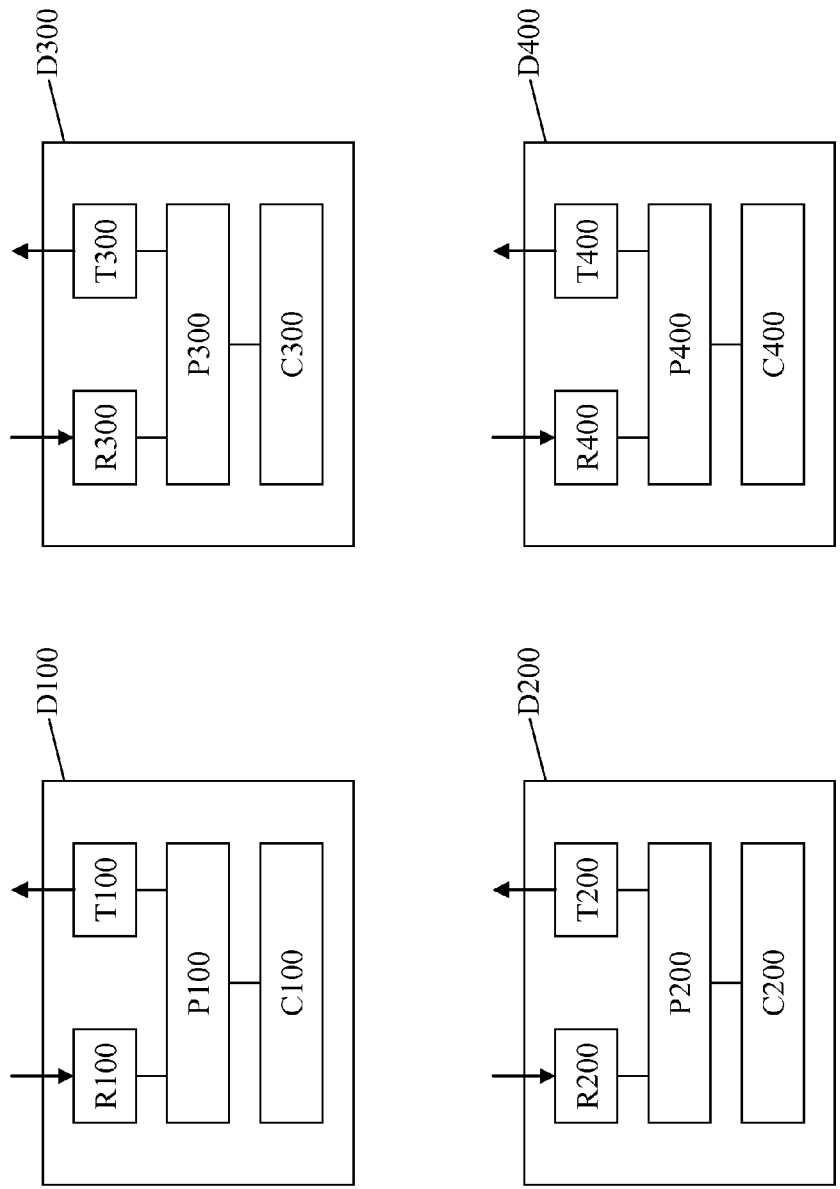
FIG. 16 illustrates constitution of different nodes of a system according to an exemplary embodiment of the invention.

FIG. 15 and FIG. 16 schematically illustrate a constitution of the nodes D100, D102, D200, D300 and D400.

Client node D100 comprises a receiving unit R100, a transmission unit T100, a processing unit P100 and a storage unit C100. The gateway node D200 also comprises a receiving unit R200, a transmission unit T200, a processing unit P200 and a storage unit C200. The gateway node D200 may also have separate network interfaces (transmission/receiving units) towards the private and the public network (like a firewall). Hence, sub-units of a gateway node may be used for security reasons (separate network interfaces to private/public networks). Also the resolving node D300 comprises a receiving unit R300, a transmission unit T300, a processing unit P300 and a storage unit C300. In a similar manner, resolving node D400 also comprises a receiving unit R400, a transmission unit T400, a processing unit P400 and a storage device C400.

An embodiment of a client node (or a routing node) D100 comprising a receiving unit R100, a transmission unit T100, a processing unit P100, and a storage unit C100 is depicted. The client node (or routing node) D100 with its individual units R100, T100, P100, C100 may be adapted to perform the steps of the methods described herein as far as related to a routing node, wherein the receiving unit R100 is adapted to receive data, the transmission unit T100 is adapted to send data, the processing unit P100 is adapted to process data, for instance to store data at and/or retrieve data from the storage unit C100 and/or to initiate a sending of data via the transmission unit T100.

The routing node D102 is adapted to communicate with the client node D100, for instance via internal (variant A) or external (variant B) interfaces. For variant A, one or more of the units R100, T100, P100, C100 may be shared with the client node D100 or may be separate.

An embodiment of a gateway node D200 comprising a receiving unit R200, a transmission unit T200, a processing unit P200, and a storage unit C200 is depicted. The gateway node D200 with its individual units R200, T200, P200, C200 may be adapted to perform the steps of the methods described herein as far as related to a gateway node, wherein the receiving unit R200 is adapted to receive data, the transmission unit T200 is adapted to send data, the processing unit P200 is adapted to process data, for instance to store data at and/or retrieve data from the storage unit C200 and/or to initiate a sending of data via the transmission unit T200.

An embodiment of a resolving node D300 of a secured network with the resolving node D300 comprising a receiving unit R300, a transmission unit T300, a processing unit P300, and a storage unit C300 is depicted. The resolving node D300 with its individual units R300, T300, P300, C300 may be adapted to perform the steps of the methods described herein as far as related to a resolving node D300, wherein the receiving unit R300 is adapted to receive data, the transmission unit T300 is adapted to send data, the processing unit P300 is adapted to process data, for instance to store data at and/or retrieve data from the storage unit C300 and/or to initiate a sending of data via the transmission unit T300.

An embodiment of a resolving node D400 of a network of information with the resolving node D400 comprising a receiving unit R400, a transmission unit T400, a processing unit P400, and a storage unit C400 is depicted. The resolving node D400 with its individual units R400, T400, P400, C400 may be adapted to perform the steps of the methods described herein as far as related to a resolving node, wherein the receiving unit R400 is adapted to receive data, the transmission unit T400 is adapted to send data, the processing unit P400 is adapted to process data, for instance to store data at and/or retrieve data from the storage unit C400 and/or to initiate a sending of data via the transmission unit T400.

Although not shown explicitly, also each of nodes D102, D500 and D600 may comprise a receiving unit, a transmission unit, a processing unit, and a storage unit.

Each unit R100-400, T100-400, P100-400, C100-400 may consist of one or more sub-units of the same or different technology. For example, the gateway node D200 may use a wireless transceiver unit R200+T200 to communicate with the client node (or routing node) D100 and a wired transceiver R200+T200 to communicate with the node D500 of the secured network and the resolving node D300. The client node (or routing node) D100 may use therefore wireless transceiver R100+T100 to communicate with the gateway node D200 but wired connection to the client node D100 (not depicted here).

FIG. 17A to FIG. 17D illustrate procedures of operating the network of information 100 according to an exemplary embodiment of the invention.

FIG. 17A relates to the steps or capabilities of the routing node D102 (or the client node D100), FIG. 17B relates to the steps or capabilities of gateway node D200, FIG. 17C relates to the steps or capabilities of resolving node D300 and FIG. 17D relates to the steps or capabilities of resolving node D400.

Regarding FIG. 17C it may be noted: For instance, such a method may relate to a publish procedure from the perspective of the resolving node of the secured network wherein the resolving node of the secured network sends to the resolving node of the network of information for instance the locator of the gateway node or redirect information which enables the resolving node of the network of information to initiate a procedure which in the end provides the locator of the gateway node to the routing node when sending the information object to the resolving node of the network of information.

Regarding the first box of FIG. 17D it may be noted: For instance, such a method may relate to a publish procedure from the perspective of the resolving node of the network of information wherein the resolving node of the network of information receives from the resolving node of the secured network for instance the locator of the gateway node or redirect information which enables the resolving node of the network of information to initiate a procedure which in the end provides the locator of the gateway node to the routing node when sending the information object to the resolving node of the network of information.

Although not shown in FIG. 17A to FIG. 17D, the individual procedures of the nodes D100, D200, D300, D400 are interconnected in a manner as shown, for instance, in the preceding figures.

In an embodiment, the client node may comprise functionality to request access to information object identities (with or without obfuscation) and—if authentication is applied—authentication functionality to authenticate at an authentication node and functionality to access the object (for instance display content represented by the information object) while the routing node comprises functionality to communicate with nodes such as the resolving nodes in the public and the secured network, gateway node and client node according to the various embodiments and to perform the necessary processing thereof as described. The client node and the routing node may be implemented in a single device client or distributed (compare also FIG. 15), for instance over two devices where the client node resides for instance on a terminal and the routing node on a first hop router (FHR) adapted to communicate with the client node. Communication between client and routing node according to the single device configuration may be performed via internal interfaces. This variant may be called client-centric or terminal centric, while the distributed option may be called a distributed or network-centric setup where parts of the client functionality are performed at terminal-side and other parts at network-side on behalf of the client.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, implemented by a routing node, for providing an information object to a client node via a network of information, the method comprising:
  receiving from the client node an information object identity related to the information object;
  sending the information object identity to a public resolving node, the public resolving node configured to initiate a procedure that causes the routing node to receive a locator of a gateway node;
  receiving the locator of the gateway node;
  sending a request for the information object to the gateway node according to the locator;
  receiving the information object from the gateway node; and
  sending the information object to the client node;
  wherein the network of information comprises:
    a secured network, comprising a node where the information object is located;
    a public network, comprising:
      the client node;
      the routing node;
      the public resolving node;
      the gateway node interfacing the secured network and the public network;
    information objects unambiguously identified based on information object identities regardless of the locations of the information objects within the network of information;
  wherein nodes of the network of information are identified by locators.

2. The method according to claim 1, wherein the request includes the information object identity.

3. The method according to claim 1, wherein a further information object identity is related to the information object, the method further comprising
  receiving the further information object identity in conjunction with the reception of the locator, and wherein the request includes the further information object identity.

4. The method according to claim 1, wherein the locator is received from the public resolving node.

5. The method according to claim 1, wherein the locator is received from a secured resolving node of the secured network.

6. The method according to claim 5, further comprising:
receiving from the public resolving node a message including information to access the secured resolving node; and
sending a message to the secured resolving node for requesting the locator.

7. The method according to claim 1, further comprising relaying content of at least one message related to an authentication of the client node towards an authentication node in the secured network.

8. The method according to claim 7, wherein the authentication is performed via the gateway node after the locator is received.

9. The method according to claim 7, wherein the authentication is performed in a first procedure before the locator is received via a secured resolving node of the secured network and in a second procedure after the locator is received via the gateway node.

10. The method according to claim 1, wherein the client node and the routing node are co-located.

11. The method according to claim 1, wherein the client node is located at a terminal and the routing node is located at a communication node of the public network.

12. A method, performed by a gateway node, for providing an information object to a client node via a network of information, the method comprising:
receiving a request including an information object identity related to the information object;
sending a request for the information object in accordance with the received information object identity to a node of the secured network where the information object is located;
receiving the information object; and
sending the information object to the routing node for sending the information object to the client node;
wherein the network of information comprises:
a secured network, comprising the node where the information object is located;
a public network, comprising:
the client node;
the routing node;
a gateway node interfacing the secured network and the public network;
information objects unambiguously identified based on information object identities regardless of the locations of the information objects within the network of information;
wherein nodes of the network of information are identified by locators.

13. The method according to claim 12, wherein the request to the node where the information object is located includes the received information object identity.

14. The method according to claim 12, wherein a further information object identity is related to the information object, the method further comprising sending the received information object identity to a secured resolving node of the secured network and receiving the further information object identity, wherein the request to the node where the information object is located comprises the further information object identity.

15. The method according to claim 12, further comprising assisting authentication of the client node towards an authentication node in the secured network.

16. A method, performed by a secured resolving node, for enabling a client node to access an information object via a network of information, the method comprising:
sending, to a public resolving node, information for enabling the public resolving node to initiate, for an information object identity related to the information object, a procedure for causing a locator of a gateway node to be received by a routing node;
wherein the network of information comprises:
a secured network, comprising:
a node where the information object is located;
the secured resolving node;
a public network, comprising:
the client node;
the routing node configured to communicate with the client node;
the public resolving node;
a gateway node interfacing the secured network and the public network;
information objects unambiguously identified based on information object identities regardless of the locations of the information objects within the network of information;
wherein nodes of the network of information are identified by locators.

17. The method according to claim 16, wherein a further information object identity is related to the information object and wherein the method further comprises performing a mapping from the information object identity to the further information object identity.

18. The method according to claim 16, wherein the information for enabling the public resolving node to initiate the procedure comprises the locator of the gateway node.

19. The method according to claim 16, wherein the procedure comprises a forwarding of the received information object identity to the secured resolving node, wherein the method further comprises:
receiving the forwarded information object identity;
obtaining the locator based on the forwarded information object identity; and
sending the obtained locator to the routing node.

20. The method according to claim 19, wherein the received forwarded information object identity is received from the routing node.

21. The method according to claim 19, wherein the obtained locator is sent via the public resolving node to the routing node.

22. The method according to claim 19, wherein the locator is sent after an authentication of the client node to an authentication node of the secured network.

23. The method according to claim 16, further comprising relaying content of at least one message related to an authentication of the client node towards an authentication node of the secured network.

24. A method, performed by a public resolving node, for enabling a client node to access an information object via a network of information, the method comprising:
receiving, from a secured resolving node, information for enabling the public resolving node to initiate, for an information object identity related to the information object, a procedure for causing a locator of a gateway node to be received by a routing node;
receiving the information object identity; and
initiating the procedure;

wherein the network of information comprises:
  a secured network, comprising:
    a node where the information object is located;
    the secured resolving node;
  a public network, comprising:
    the client node;
    the routing node configured to communicate with the client node;
    the public resolving node;
    the gateway node interfacing the secured network and the public network;
    information objects unambiguously identified based on information object identities regardless of the locations of the information objects within the network of information;
  wherein nodes of the network of information are identified by locators.

25. The method according to claim 24, wherein the information for enabling the public resolving node to initiate the procedure comprises the locator of the gateway node and the initiating of the procedure comprises a sending of the locator to the routing node.

26. The method according to claim 24, wherein the procedure comprises a forwarding of the received information object identity to the secured resolving node.

27. The method according to claim 26, wherein received information object identity is forwarded via the routing node.

28. The method according to claim 24, further comprising relaying content of at least one message from the client node to the secured resolving node related to an authentication of the client node towards an authentication node of the secured network.

29. A routing node for providing an information object to a client node, wherein the routing node comprises:
  a receiving unit;
  a transmission unit; and
  a processing unit, wherein the processing unit is configured to:
    receive, via the receiving unit and from the client node, an information object identity related to the information object;
    send, via the transmission unit, the information object identity to a public resolving node, the public resolving node configured to initiate a procedure for causing the routing node to receive a locator of a gateway node;
    receive, via the receiving unit, the locator of the gateway node;
    send, via the transmission unit, a request for the information object to the gateway node according to the locator;
    receive the requested information object from the gateway node via the receiving unit; and
    send, via the transmission unit, the information object to the client node;
  wherein the network of information comprises:
    a secured network, comprising a node where the information object is located;
    a public network, comprising:
      the client node;
      the routing node;
      the public resolving node;
      the gateway node interfacing the secured network and the public network;
      information objects unambiguously identified based on information object identities regardless of the locations of the information objects within the network of information;
  wherein nodes of the network of information are identified by locators.

30. A gateway node for providing an information object to a client node, wherein the gateway node comprises:
  a receiving unit;
  a transmission unit; and
  a processing unit, wherein the processing unit is configured to:
    receive, via the receiving unit, a request including an information object identity related to the information object;
    send a request for the information object in accordance with the received information object identity to a node of the secured network where the information object is located, via the transmission unit;
    receive the requested information object via the receiving unit; and
    send the requested information object to a routing node, via the transmission unit, for sending the information object to the client node;
  wherein the network of information comprises:
    a secured network, comprising the node where the information object is located;
    a public network, comprising:
      the client node;
      the routing node;
      the gateway node interfacing the secured network and the public network;
      information objects unambiguously identified based on information object identities regardless of the locations of the information objects within the network of information;
  wherein nodes of the network of information are identified by locators.

31. A secured resolving node enabling a client node to access an information object via a network of information, wherein the resolving node comprises:
  a receiving unit;
  a transmission unit; and
  a processing unit, wherein the processing unit is configured to:
    send, via the transmission unit and to a public resolving node, information for enabling the public resolving node to initiate for an information object identity related to the information object a procedure for causing a locator of the gateway node to be received by a routing node;
  wherein the network of information comprises:
    a secured network, comprising:
      a node where the information object is located;
      the secured resolving node;
    a public network, comprising:
      the client node;
      the routing node configured to communicate with the client node;
      the public resolving node;
      a gateway node interfacing the secured network and the public network;
      information objects unambiguously identified based on information object identities regardless of the locations of the information objects within the network of information;

wherein nodes of the network of information are identified by locators.

32. A public resolving node for enabling a client node to access an information object via a network of information, wherein the public resolving node comprises:
- a receiving unit;
- a transmission unit; and
- a processing unit, wherein the processing unit is configured to:
  - receive, from a secured resolving node and via the receiving unit, information for enabling the public resolving node to initiate, for an information object identity related to the information object, a procedure for causing a locator of the gateway node to be received by a routing node;
  - receive the information object identity via the receiving unit; and
  - initiate the procedure;

wherein the network of information comprises:
- a secured network, comprising:
  - a node where the information object is located;
  - the secured resolving node;
- a public network, comprising:
  - the client node;
  - the routing node configured to communicate with the client node;
  - the public resolving node;
- a gateway node interfacing the secured network and the public network;
- information objects unambiguously identified based on information object identities regardless of the locations of the information objects within the network of information;

wherein nodes of the network of information are identified by locators.

* * * * *